(12) United States Patent
He et al.

(10) Patent No.: US 10,516,882 B2
(45) Date of Patent: Dec. 24, 2019

(54) INTRA-BLOCK COPY SEARCHING

(71) Applicant: Vid Scale, Inc., Wilmington, DE (US)

(72) Inventors: Yuwen He, San Diego, CA (US); Xiaoyu Xiu, San Diego, CA (US); Yan Ye, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 15/546,764

(22) PCT Filed: Jan. 28, 2016

(86) PCT No.: PCT/US2016/015457
§ 371 (c)(1),
(2) Date: Jul. 27, 2017

(87) PCT Pub. No.: WO2016/123398
PCT Pub. Date: Aug. 4, 2016

(65) Prior Publication Data
US 2018/0014011 A1    Jan. 11, 2018

Related U.S. Application Data

(60) Provisional application No. 62/109,548, filed on Jan. 29, 2015.

(51) Int. Cl.
*H04N 19/105*    (2014.01)
*H04N 19/196*    (2014.01)
(Continued)

(52) U.S. Cl.
CPC ......... *H04N 19/105* (2014.11); *H04N 19/176* (2014.11); *H04N 19/186* (2014.11); *H04N 19/197* (2014.11); *H04N 19/593* (2014.11)

(58) Field of Classification Search
None
See application file for complete search history.

(56) References Cited

U.S. PATENT DOCUMENTS 6,275,533 B1    8/2001    Nishi
8,086,052 B2   12/2011    Toth et al.
(Continued)

FOREIGN PATENT DOCUMENTS

CN    1426223 A      6/2003
CN  101185332 A      5/2008
(Continued)

OTHER PUBLICATIONS

Boyce et al., "Draft High Efficiency Video Coding (HEVC) Version 2, Combined Format Range Extensions (RExt), Scalability (SHVC), and Multi-View (MV-HEVC) Extensions", JCTVC-R1013, 18th Meeting: Sapporo, JP, Jun. 30-Jul. 9, 2014, 382 pages.
(Continued)

*Primary Examiner* — Lindsay J Uhl
(74) *Attorney, Agent, or Firm* — Condo Roccia Koptiw LLP

(57) ABSTRACT

A video coding device may encode a video signal using intra-block copy prediction. A first picture prediction unit of a first picture may be identified. A second picture may be coded and identified. The second picture may be temporally related to the first picture, and the second picture may include second picture prediction units. A second picture prediction unit that is collocated with the first picture prediction unit may be identified. Prediction information for the first picture prediction unit may be generated. The prediction information may be based on a block vector of the second picture prediction unit that is collocated with the first picture prediction unit.

19 Claims, 20 Drawing Sheets

(51) Int. Cl.
*H04N 19/176* (2014.01)
*H04N 19/593* (2014.01)
*H04N 19/186* (2014.01)

(56) References Cited

U.S. PATENT DOCUMENTS

| | | | |
|---|---|---|---|
| 8,086,245 | B2 | 12/2011 | Karaoguz et al. |
| 8,978,105 | B2 | 3/2015 | Gast |
| 9,148,823 | B2 | 9/2015 | Forssell |
| 2012/0122514 | A1 | 5/2012 | Cheng et al. |
| 2013/0163663 | A1 | 6/2013 | Yu et al. |
| 2013/0279599 | A1 | 10/2013 | Wang |
| 2014/0301465 | A1 | 10/2014 | Kwon et al. |
| 2015/0063440 | A1 | 3/2015 | Pang et al. |
| 2015/0261884 | A1 | 9/2015 | Pang et al. |
| 2015/0264348 | A1 | 9/2015 | Zou et al. |
| 2015/0264372 | A1 | 9/2015 | Kolesnikov et al. |
| 2015/0264396 | A1 | 9/2015 | Zhang et al. |
| 2015/0271505 | A1* | 9/2015 | Ma .................. H04N 19/27 375/240.08 |
| 2015/0373359 | A1 | 12/2015 | He et al. |
| 2015/0373366 | A1 | 12/2015 | He et al. |
| 2016/0100186 | A1* | 4/2016 | Gisquet .......... H04N 19/52 382/238 |
| 2016/0255344 | A1* | 9/2016 | Lee ................ H04N 19/105 375/240.13 |

FOREIGN PATENT DOCUMENTS

| | | |
|---|---|---|
| CN | 104303500 A | 1/2015 |
| EP | 2772058 A1 | 9/2014 |
| GB | 2531003 A | 4/2016 |
| GB | 2531086 A | 4/2016 |
| WO | 2013/068564 A1 | 5/2013 |
| WO | WO 2013/101643 A1 | 7/2013 |
| WO | WO 2015/031806 A1 | 3/2015 |
| WO | WO 2015/052273 A1 | 4/2015 |
| WO | WO 2015/058395 A1 | 4/2015 |
| WO | WO 2015/058397 A1 | 4/2015 |
| WO | WO 2015/131325 A1 | 9/2015 |
| WO | WO 2015/131326 A1 | 9/2015 |
| WO | WO 2015/139165 A1 | 9/2015 |
| WO | WO 2015/142829 A1 | 9/2015 |
| WO | WO 2015/169200 A1 | 11/2015 |

OTHER PUBLICATIONS

Chen et al., "Description of Screen Content Coding Technology Proposal by Qualcomm", Qualcomm Incorporated, JCTVC-Q0031, 17th Meeting: Valencia, ES, Mar. 27-Apr. 4, 2014, 19 pages.
Chen et al., "Description of Screen Content Coding Technology Proposal by NCTU and ITRI International", National Chiao Tung University (NCTU), ITRI International, JCTVC-Q0032, 17th Meeting: Valencia, ES, Mar. 27-Apr. 4, 2014, 26 pages.
Chen et al., "HEVC Screen Content Coding Core Experiment 2 (SCCE2): Line-Based Intra Copy", SCCE Coordinators, JCTVC-Q1122, 17th Meeting: Valencia, ES, Mar. 27-Apr. 4, 2014, 04 pages.
Chen et al., "HEVC Screen Content Coding Core Experiment 4 (SCCE4): String Matching for Sample Coding", CE Coordinators, JCTVC-Q1124, 17th Meeting: Valencia, ES, Mar. 27-Apr. 4, 2014, 03 pages.
Cohen et al., "Description of Screen Content Coding Technology Proposal by Mitsubishi Electric Corporation", Mitsubishi Electric Corporation, JCTVC-Q0036, 17th Meeting: Valencia, ES, Mar. 27-Apr. 4, 2014, 25 pages.
Flynn et al., "High Efficiency Video Coding (HEVC) Range Extensions Text Specification: Draft 6", JCTVC-P1005, 16th Meeting: San José, US, Jan. 9-17, 2014, 368 pages.
Guo et al., "AHG8: Major-Color-Based Screen Content Coding", Microsoft Corp., JCTVC-O0182, 15th Meeting: Geneva, CH, Oct. 23-Nov. 1, 2013, 10 pages.
Guo et al., "Evaluation of Palette Mode Coding on HM-12.0+RExt-4.1", Qualcomm Incorporated, JCTVC-O0218, 15th Meeting: Geneva, CH, Oct. 23-Nov. 1, 2013, 06 pages.
He et al., "Non-CE2: Encoder Improvements on IBC Search", InterDigital Communications, Inc., JCTVC-T0116, 20th Meeting: Geneva, CH, Feb. 10-18, 2015, 5 pages.
He et al., "Non-SCCE1: Improved Intra Block Copy Coding with Block Vector Derivation", InterDigital Communications, Inc., JCTVC-R0165, 18th Meeting: Sapporo, JP, Jun. 30-Jul. 9, 2014, 8 pages.
He et al., "Non-SCCE1: Intra Block Copy Hash Search Enhancement", JCTVC-R0162, Joint Collaborative Team on Video Coding (JCT-VC) of ITU-T SG 16 WP 3 and ISO/IEC JTC 1/SC 29/WG 11, 18th Meeting: Sapporo, JP, Jun. 30- Jul. 9, 2014, 6 pages.
Hsiang et al., "AHG8: Coding the Prediction Differences of the Intra BC Vectors", MediaTek, Inc., JCTVC-Q0095, 17th Meeting: Valencia, ES, Mar. 27-Apr. 4, 2014, 04 pages.
Huang et al., "Description of Screen Content Core Experiment 3 (SCCE3): Palette Mode", CE Coordinators, JCTVC-Q1123, 17th Meeting: Valencia, ES, Mar. 27-Apr. 4, 2014, 11 pages.
ITU/ISO/IEC, "Joint Call for Proposals for Coding of Screen Content", ISO/IEC JTC1/SC29/WG11 MPEG2014/N14175, San Jose, USA, Jan. 2014, 16 pages.
Joshi et al., "Screen Content Coding Test Model 3 Encoder Description (SCM 3)", JCTVC-S1014, Strasbourg, FR, Oct. 17-24, 2014, 12 pages.
Joshi et al., "Working Draft 2 of HEVC Screen Content Coding", JCT-VC, ISO/IEC JTC1/SC29/WG11 N 14969, Strasbourg, France, Oct. 2014, 374 pages.
Lai et al., "Description of Screen Content Coding Technology Proposal by MediaTek", MediaTek, Inc., JCTVC-Q0033, 17th Meeting: Valencia, ES, Mar. 27-Apr. 4, 2014, 31 pages.
Laroche et al., "Non-CE2: Intra Block Copy Encoder Improvements for SCM2.0", Canon CRF, JCTVC-50065, 19th Meeting: Strasbourg, FR, Oct. 17-24, 2014, 3 pages.
Li et al., "Adaptive Motion Vector Resolution for Screen Content", JCTVC-S0085, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-14.
Li et al., "Description of Screen Content Coding Technology Proposal by Microsoft", Microsoft Corp., JCTVC-Q0035, 17th Meeting: Valencia, ES, Mar. 27-Apr. 4, 2014, 27 pages.
Li et al., "Hash-Based IntraBC Search", Microsoft Corp., JCTVC-Q0252, 17th Meeting: Valencia, ES, Mar. 27-Apr. 4, 2014, 02 pages.
Lin et al., "AHG8: P2M Based Dual-Coder Extension of HEVC", Tongji University, Shanghai, China, JCTVC-L0303, 12th Meeting: Geneva, CH, Jan. 14-23, 2013, 5 pages.
Ma et al., "Description of Screen Content Coding Technology Proposal by Huawei Technologies, Inc.", Huawei Technologies (USA), JCTVC-Q0034, 17th Meeting: Valencia, ES, Mar. 27-Apr. 4, 2014, 14 pages.
Onno et al., "AhG5: On the Displacement Vector Prediction Scheme for Intra Block Copy", Canon, JCTVC-Q0062, 17th Meeting: Valencia, ES, Mar. 27-Apr. 4, 2014, 06 pages.
Pang et al., "Block Vector Prediction Method for Intra Block Copy", Qualcomm Inc., JCTVC-Q0114, 17th Meeting: Valencia, ES, Mar. 27-Apr. 4, 2014, 03 pages.
Pang et al., "Intra Block Copy with Encoder Search using Chroma Component", Qualcomm Inc., JCTVC-Q0175, 17th Meeting: Valencia, ES, Mar. 27-Apr. 4, 2014, 03 pages.
Pang et al., "Non-RCE3: Intra Motion Compensation with 2-D MVs", Qualcomm Inc., JCTVC-N0256, 14th Meeting: Vienna, AT, Jul. 25-Aug. 2, 2013, 12 pages.
Sole et al., "AhG8: Requirements for Wireless Display Applications", Qualcomm, JCTVC-M0315, 13th Meeting: Incheon, KR, Apr. 18-26, 2013, 2 pages.
Sole et al., "HEVC Screen Content Coding Core Experiment 1 (SCCE1): Intra Block Copying Extensions", SCCE Coordinators, JCTVC-Q1121, 17th Meeting: Valencia, ES, Mar. 27-Apr. 4, 2014, 04 pages.
Sullivan et al., "Rate-Distortion Optimization for Video Compression", Signal Processing Magazine, IEEE, vol. 15, No. 6, Nov. 1998, pp. 74-90.

(56) References Cited

OTHER PUBLICATIONS

Vermeir, Thijs, "Use Cases and Requirements for Lossless and Screen Content Coding", JCTVC-M0172, 13th Meeting: Incheon, KR, Apr. 18-26, 2013, 6 pages.

Wikipedia, "Locality Sensitive Hash", Available at https://en.wikipedia.org/wiki/Locality-sensitive_hashing, Retrieved on Aug. 3, 2017, 6 pages.

Xiu et al., "Description of Screen Content Coding Technology Proposal by InterDigital", InterDigital Communications, LLC, JCTVC-Q0037, 17th Meeting: Valencia, ES, Mar. 27-Apr. 4, 2014, 30 pages.

Xiu et al., "HEVC Screen Content Coding Core Experiment 5 (SCCES): Inter-Component Prediction and Adaptive Color Transforms", SCCE Coordinators, JCTVC-Q1125, 17th Meeting: Valencia, ES, Mar. 27-Apr. 4, 2014, 04 pages.

Zhang et al., "Block Vector Prediction for Intra Block Copy", MediaTek Inc., JCTVC-Q0080, 17th Meeting: Valencia, ES, Mar. 27-Apr. 4, 2014, 05 pages.

Zhang et al., "Symmetric Intra Block Copy", MediaTek Inc., JCTVC-Q0082, 17th Meeting: Valencia, ES, Mar. 27-Apr. 4, 2014, 08 pages.

Zhu et al., "Hash-Based Block Matching for Screen Content Coding", IEEE Transactions on Multimedia, vol. 17, No. 7, Jul. 2015, pp. 935-944.

Zhu et al., "Ping-Pong Block Vector Predictor for Intra Block Copy", Microsoft Corp., JCTVC-Q0134, 17th Meeting: Valencia, ES, Mar. 27-Apr. 4, 2014, 05 pages.

Zou et al., "Hash Based Intra String Copy for HEVC Based Screen Content Coding", Qualcomm Inc., IEEE International Conference on Multimedia & Expo Workshops (ICMEW), Jun. 29-Jul. 3, 2015, pp. 1-4.

Ahn et al., "Fast Intra Coding Mode Decision for Screen Contests Coding", KWU (Kwangwoon University), JCTVC-50149, 19th Meeting: Strasbourg, FR, Oct. 17-24, 2014, 5 pages.

Pang et al., "Non-CE2: Intra block and Inter Signaling Unification", Qualcomm, Inc, MediaTek, Microsoft Corp., JCTVC-S0302-v1, 19th Meeting: Strasbourg, FR, Oct. 17-24, 2014, 6 pages.

Joshi et. al., "Screen Content Coding Test Model 4 (SCM 4)", JCTVC-T1014, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-12.

Kwon et. al., "AHG5: Fast Encoding Using Early Skipping of Intra Block Copy (IntraBC) Search", Texas Instruments Inc., JCTVC-00245, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, pp. 1-12.

He et al., "Non-CE2: Unification of IntraBC Mode with Inter Mode", InterDigital Communications, Inc., MediaTek, Microsoft Corp., JCTVC-S0172, 19th Meeting: Strasbourg, FR, Oct. 17-24, 2014, 8 pages.

Kwon et al., "Fast Intra Block Copy (IntraBC) Search for HEVC Screen Content Coding", IEEE International Symposium on Circuits and Systems (ISCAS), Melbourne VIC, Jun. 2014, pp. 9-12.

\* cited by examiner

INTRA-BLOCK COPY SEARCHING

CROSS REFERENCE

This application is the National Stage Entry under 35 U.S.C. § 371 of Patent Cooperation Treaty Application No. PCT/US2016/015457, filed Jan. 28, 2016, which claims the benefit of U.S. Provisional Application No. 62/109,548, filed on Jan. 29, 2015, which is incorporated herein by reference as if fully set forth.

BACKGROUND

In recent years, screen content sharing applications have become more popular with the advancing capabilities of desktop and mobile computing systems and the corresponding increase in the use of remote desktop, video conferencing, and mobile media presentation applications. The quality of content shared across devices using such applications is dependent on the use of an efficient screen content compression. This is even more important when devices with higher resolutions are used (e.g., high definition and ultra-high definition).

SUMMARY

Intra-block copy searching may be performed. A video coding device may encode a video signal using intra-block copy prediction. A first picture prediction unit of a first picture may be identified. A second picture may be coded and identified. The second picture may be temporally related to the first picture, and the second picture may include second picture prediction units. A second picture prediction unit that is collocated with the first picture prediction unit may be identified. Prediction information for the first picture prediction unit may be generated. The prediction information may be based on a block vector of the second picture prediction unit that is collocated with the first picture prediction unit.

A hash may be generated for use in searching an image. A visual content block may be partitioned into sub-blocks. A direct current (DC) value of a sub-block may be determined, and a DC value of the visual content block may be determined. The DC value of the sub-block and the DC value of the visual content block may be compared. A hash value may be generated, where the hash value is based on the comparison.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be examples and in no way limit the scope of the application.

Figure 1:
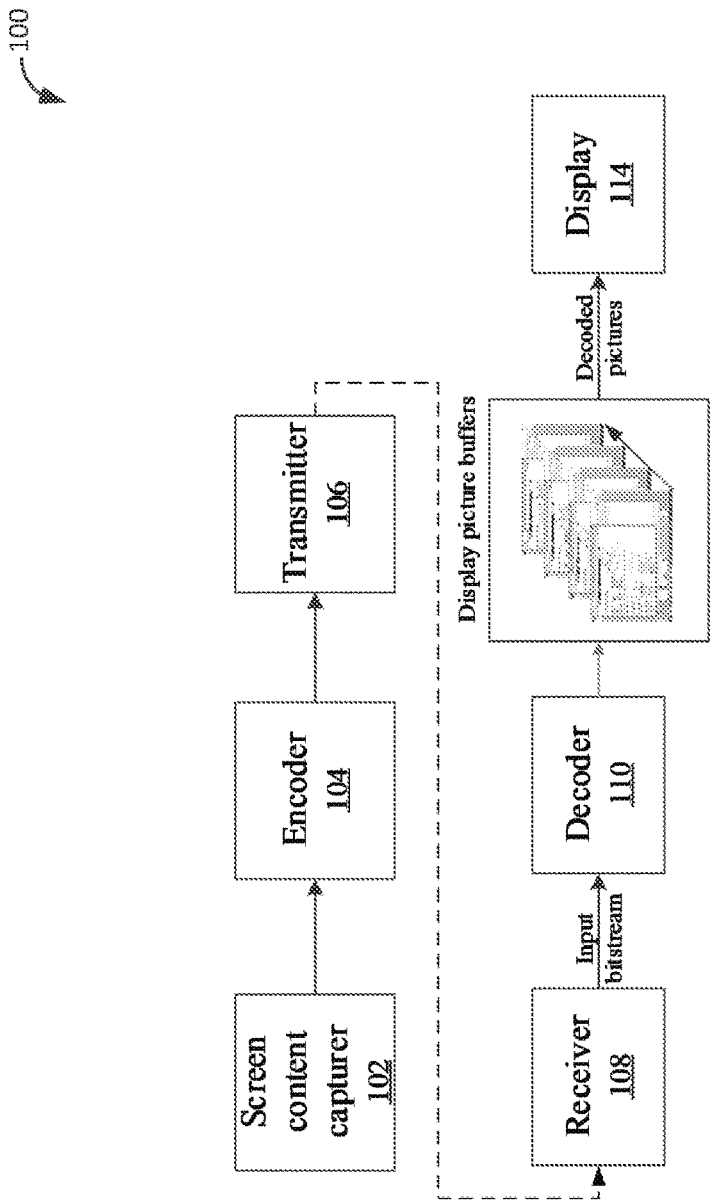
FIG. 1 illustrates an example screen content sharing system.

Screen content sharing applications have become more popular with the advancing capabilities of desktop and mobile computing systems and the corresponding increase in the use of remote desktop, video conferencing, and mobile media presentation applications. FIG. 1 illustrates a general block diagram of example two-way screen content sharing system 100. System 100 may include a host subsystem that may include a screen content capturer 102, an encoder 104, and/or a transmitter 106. System 100 may include a client sub-system that may include a receiver 108, a decoder 110, and/or a display 114 (may also be referred to herein as a "renderer"). There may be application constraints that may be used to comply with one or more standards and/or conventions for screen content coding ("SCC"). "Screen content" as used herein may include hybrid characteristics from pure screen content (e.g., text, curves, graphics) and/or natural video content (e.g., video and/or images rendered on the screen during playback). There may be several blocks in such screen content that may include more than one color and/or sharp edge that may be present in regions that may contain several sharp curves and/or texts inside. In such blocks, there may be very little noise generated in screen content. Motion in computer rendered regions may be represented as integer pixel movement.

Coding in red, green, blue ("RGB") space may be used for high fidelity image display(s). Video compression may be used to encode screen content and/or may be used to transmit such content to a receiver. Video compression may be used for natural video encoding and/or may be used for screen content other than natural video. In purely natural video codings, coding distortion may be distributed, e.g., over an image and/or a picture. Where one or more large coding errors are present, such errors may be located around "strong" edges that have large gradient values (e.g., edges between sections of such an image and/or picture that have a high contrast to one another, contours of text), making artifacts associated with such errors more visible, even when an associated peak signal to noise ratio (PSNR) is relatively high for the associated whole image and/or picture.

Screen content compression technologies may compress screen content and/or may provide a relatively high quality of service in the associated screen content sharing related application(s). Efficient screen content compression methods and systems may be useful, e.g., where users share device content for media presentations and/or remote desktop uses. Screen resolutions of mobile devices has increased to high definition and/or ultra-high definition. Video encoding tools (e.g., block-based hybrid coding technologies), may be optimized for natural video coding and/or may be designed for screen content coding.

Figure 2:
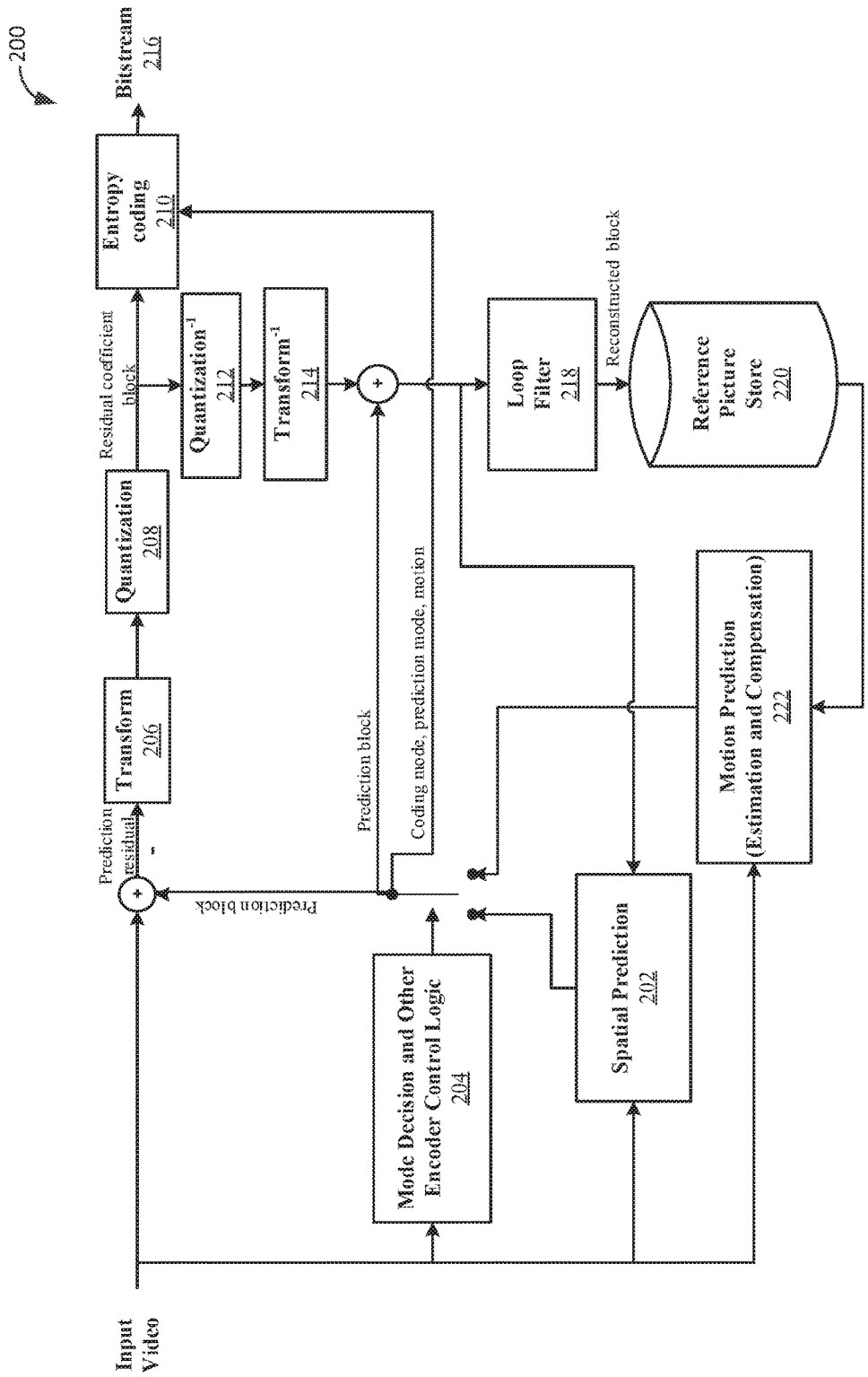
FIG. 2 illustrates a block diagram of an example video encoder.

FIG. 2 illustrates a block diagram of a generic block-based single layer video encoder 200. As shown in FIG. 2, to achieve efficient compression, a single layer encoder may employ techniques such as spatial prediction 202 (also may be referred to herein as intra-prediction), with one or more various prediction modes and/or temporal prediction (that may be referred to herein as inter-prediction or motion compensated prediction) to predict an input video signal.

An encoder may have mode decision logic 204 that may choose a form of prediction. Selecting a form of prediction may be based on one or more criteria, such as a combination of rate and distortion considerations. Such an encoder may then transform 206 and/or quantize 208 a prediction residual (e.g., a signal representing a difference between an input signal and a prediction signal). Such a quantized residual, together with mode information (e.g., intra- or inter-prediction) and/or prediction information (e.g., block vectors, motion vectors, reference picture indexes, intra prediction modes, etc.) may be compressed at an entropy coder 210 and/or packed into an output video bitstream 216. As shown in FIG. 2, such an encoder may generate a reconstructed video signal by applying inverse quantization 212 and/or an inverse transform 214 to the quantized residual to obtain a reconstructed residual, and may add such a reconstructed residual back to a prediction signal. Such a reconstructed video signal may be sent through a loop filter process 218 (e.g., a deblocking filter, sample adaptive offsets, adaptive loop filters) and may be stored in a reference picture buffer 220 that may be used for predicting 222 a future video signal.

Figure 3:
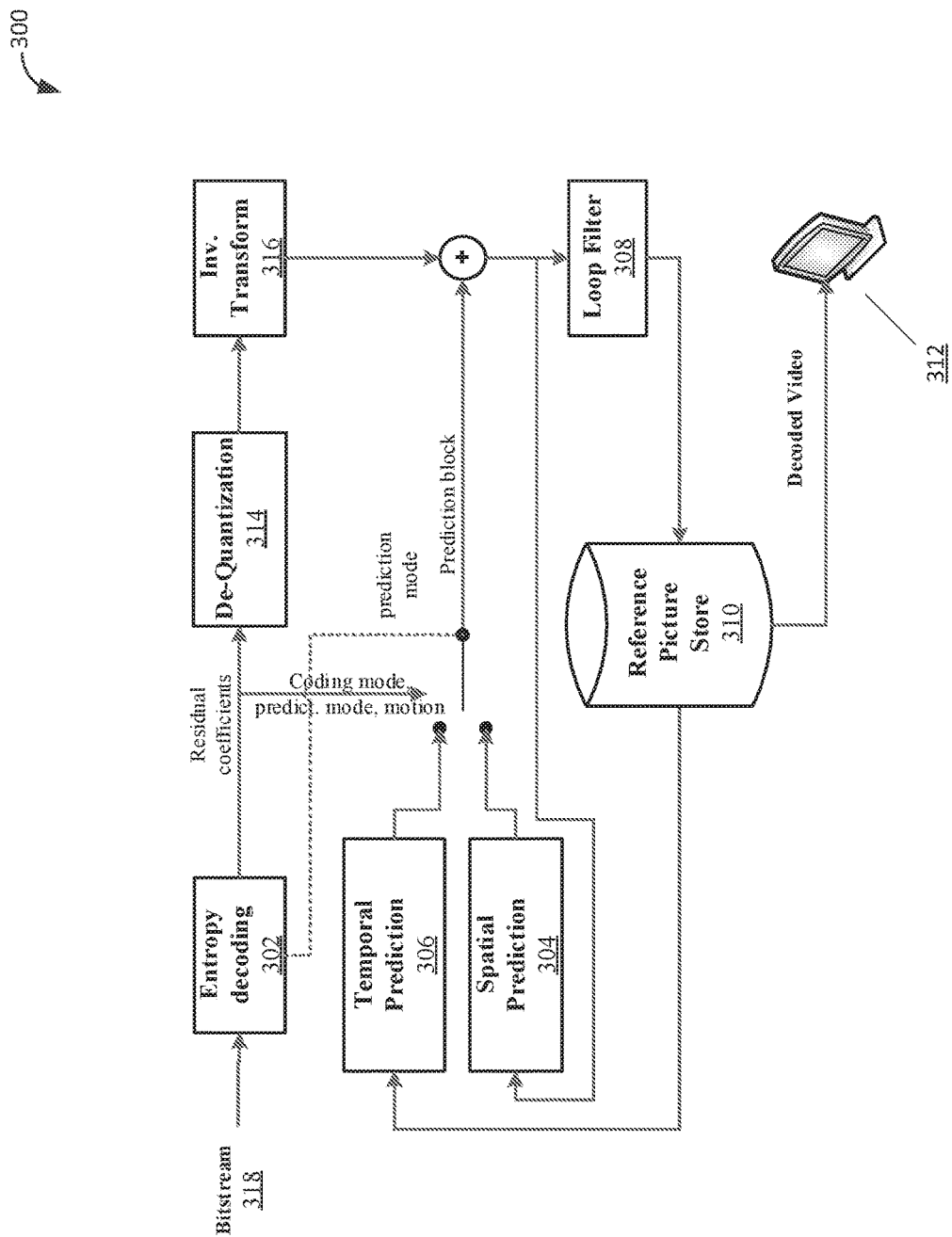
FIG. 3 illustrates a block diagram of an example video decoder.

FIG. 3 illustrates a block diagram of block-based single layer decoder 300 that may receive a video bitstream 318 that may be produced by an encoder such as that illustrated in system 200 of FIG. 2. Decoder 300 may reconstruct such a video bitstream 318 signal for display on a device. At a video decoder, the bitstream 318 may be parsed by an entropy decoder 302. Residual coefficients may be inverse quantized 314 and/or inverse transformed 316 to obtain a reconstructed residual signal. A coding mode, such as intra-prediction information (e.g., partition, block vector(s)) and/or inter-prediction information (e.g., partition, motion vector(s)) may be used to obtain a prediction signal by applying spatial prediction 304 and/or temporal prediction 306. The prediction signal and the reconstructed residual may be added together to obtain a reconstructed video. Such a reconstructed video may be provided to a loop filter 308 and stored in a reference picture buffer 310 so that the reconstructed video may be displayed 312 and/or used to decode a future video signal.

Figure 4:
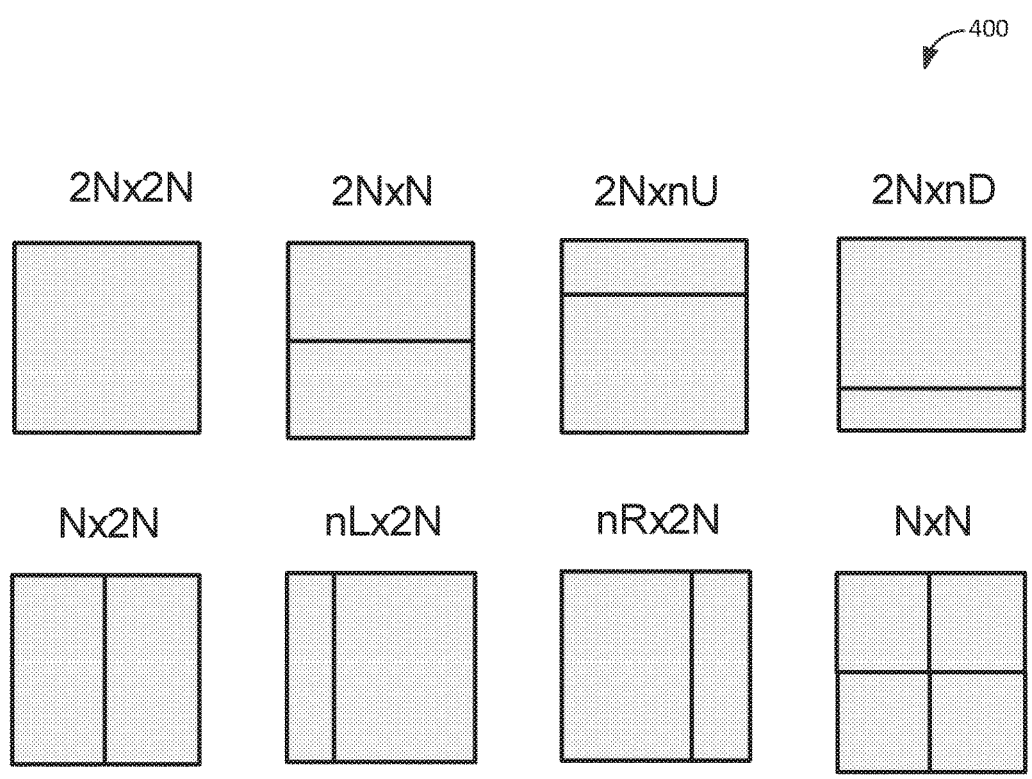
FIG. 4 illustrates example prediction unit modes.

Video coding standards (e.g., Moving Picture Experts Group ("MPEG") standards) may be used to reduce transmission bandwidth and/or storage. For example, block based hybrid video coding may be implemented. An encoder and/or decoder may be configured to operate as shown in the systems of FIG. 2 and FIG. 3. Larger video blocks and a quadtree partition may be used to signal block coding information. A picture and/or slice of an image may be partitioned into coding tree blocks ("CTBs") having a same size (e.g., 64×64). Each CTB may be partitioned into coding units ("CUs") having a quadtree structure, and each CU may be partitioned further into prediction units ("PUs") and transform units ("TUs") that each may also have a quadtree structure. For each inter-coded CU, its associated PU may be one of 8 partition modes as shown in diagram 400 illustrated in FIG. 4.

Temporal prediction, which may also be referred to as motion compensation, may be applied to reconstruct inter-coded PUs. Linear filters may be applied to obtain pixel values at fractional positions. For example, interpolation filters may have seven (7) or eight (8) taps for luma and/or four (4) taps for chroma. A deblocking filter may be content based, where different deblocking filter operations may be applied at the TU and PU boundaries, depending on one or more factors (e.g., a coding mode difference, a motion difference, a reference picture difference, a pixel value difference, similar factors, and/or a combination thereof). For entropy coding, context-based adaptive arithmetic binary coding ("CABAC") for block level syntax elements may be used. For entropy coding, context-based adaptive arithmetic binary coding ("CABAC") may not be used for high level parameters. In CABAC coding, one or more bins may be context-based coded regular bins, and/or another one or more bins may be by-pass coded bins without context.

Various block coding modes may be used. For example, spatial redundancy may not be used for screen content coding. This may be due to a focus on continuous tone video content, for example, in 4:2:0 format. Mode decision and/or transform coding tools may not be optimized for discrete tone screen content that may be captured in 4:4:4 video format.

Screen content material (e.g., text and/or graphics) may show different characteristics. One or more coding tools may be used to increase the coding efficiency of screen content coding. For example, 1-D string copy, palette coding, intra-block copy ("IntraBC"), adaptive color space conversion, and/or adaptive motion vector resolution coding tools may be used.

Screen content such as text and/or graphics may have repetitive patterns in terms of line segments and/or small blocks, and/or may have homogeneous small regions (e.g., mono-color regions or dual-color regions). Few colors may exist within a small block associated with text and/or graphics screen content. In a small block associated with natural video, there may be many colors.

A color value (e.g., a color value at each position) may be repeated from its above or left/right pixel. A 1-D string copy may copy a string (e.g., with variable length) from previously reconstructed pixel buffers. A position and/or string length may also be signaled. For palette coding, a palette table may be used as a dictionary to record significant colors in a coding block. A corresponding palette index map may be used to represent a color value of each pixel within a coding block and/or may be used to signal to a decoder, e.g., so that the decoder may reconstruct pixel values (e.g., using a look up table with the decoded index). Run values may be used to indicate a length of consecutive pixels that may have the same palette index in a horizontal and/or a vertical direction, e.g., to reduce the spatial redundancy of the palette index map. Palette coding may be efficient for large blocks that may contain sparse colors. A reduction of native RGB color space may be achieved, e.g., by using an adaptive color space conversion that may convert and/or encode a signal in another color space (e.g., a YCgCo color model ("YCgCo")).

Figure 5:
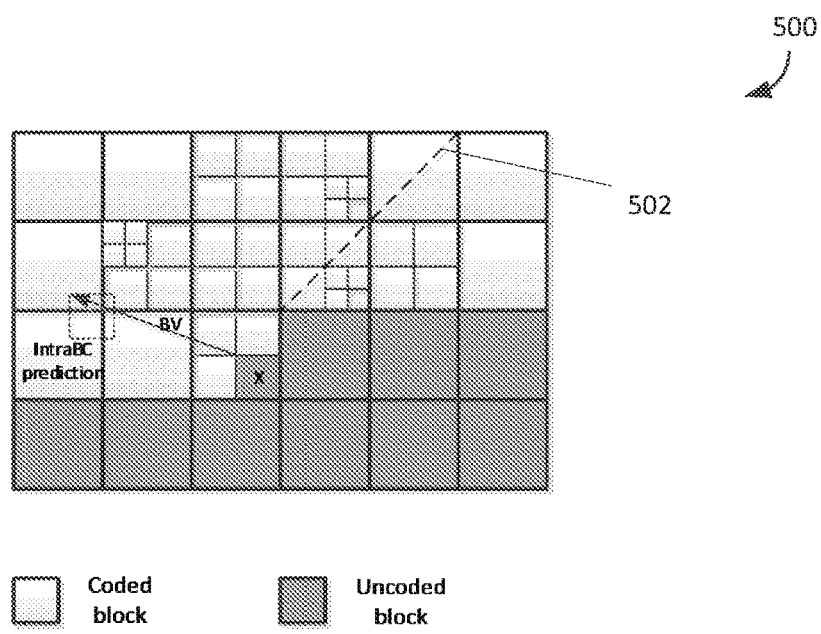
FIG. 5 illustrates an example full frame intra-block copy mode.
Figure 6:
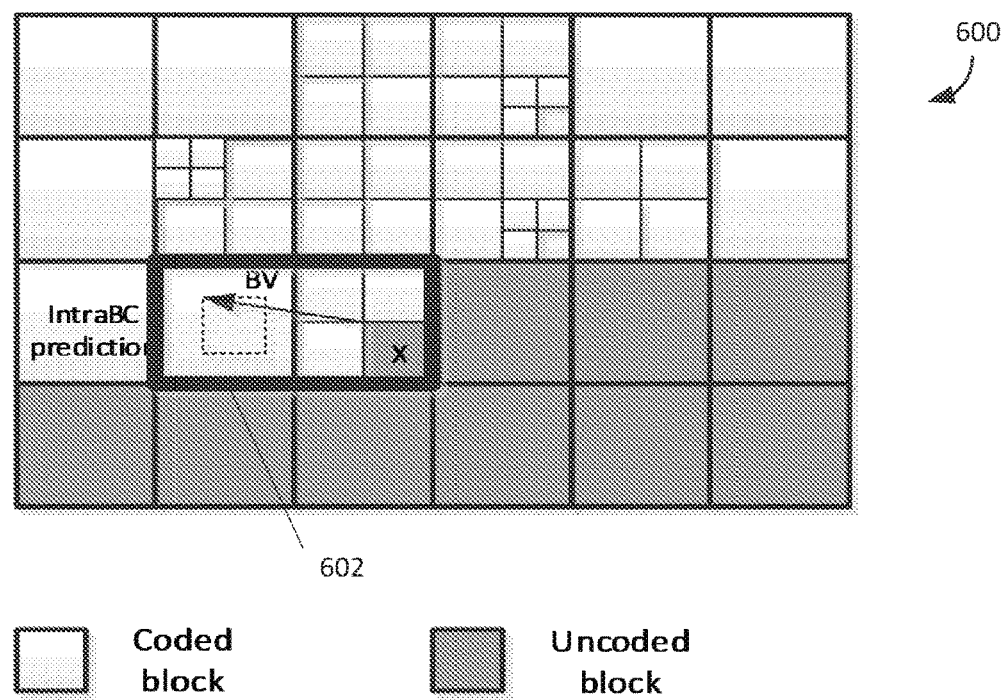
FIG. 6 illustrates an example local region intra-block copy mode.

Intra-block copy ("IntraBC") may use reconstructed pixels before in-loop filtering, e.g., to predict one or more current prediction units in a current coding block within a same picture. Displacement information, which may be referred to as a block vector ("BV"), may be coded. FIG. 5 shows diagram 500 illustrating an example of IntraBC. Screen content coding extension reference software may have one or more (e.g., two) spatial search window settings for IntraBC mode. One setting may be for a full frame search window that allows reconstructed pixels to be used for prediction. Such reconstructed pixels (e.g., such as those shown at the right bottom of the dashed line 502 in diagram 500) may not be allowed as reference pixels for IntraBC, e.g., in order to facilitate implementation of parallel decoding (e.g., when Wavefront Parallel Processing ("WPP") is used). A search window setting may be a small local region (e.g., the region shown in diagram 600 of FIG. 6), where reconstructed pixels in the left and/or current coding tree units ("CTU") (e.g., the emphasized block 602 shown in diagram 600) may be allowed to be used as reference pixels for IBC.

Figure 7:
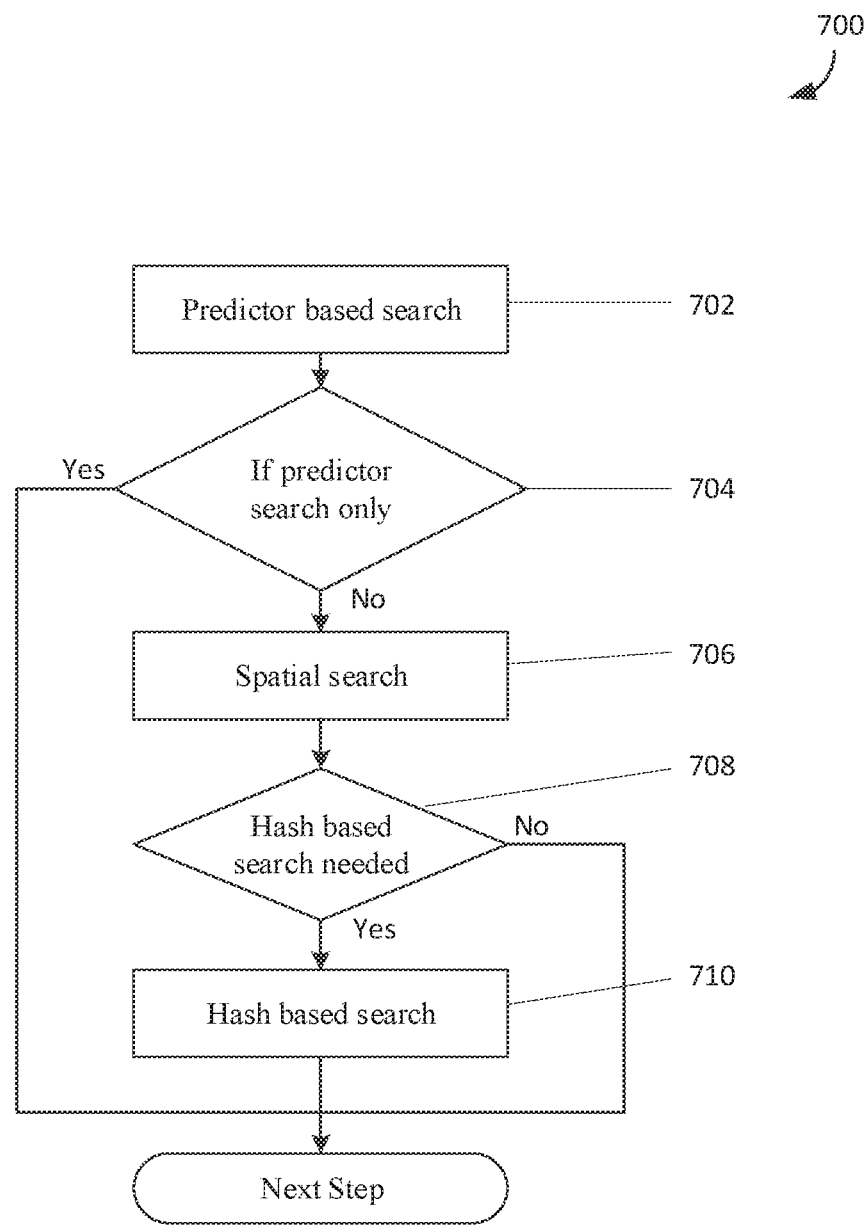
FIG. 7 illustrates an example intra-block copy (IntraBC) search.

An example IntraBC search 700 is shown in FIG. 7. A variety of IntraBC searches may be used, e.g., a predictor-based search 702 may be used. As shown in FIG. 7, if a predictor-based search is not the only IntraBC search to be used, for example, a spatial search 706 may be used. If a hash-based search is to be used (e.g., if a hash-based search is needed, in addition to a predictor-based search), a hash-based search 710 may be used. Though FIG. 7 shows the searches used in succession, a search (e.g., a predictor-based search 702, a spatial search 706, a hash-based search 710, etc.) may be used individually, and/or a search may be combined with one or more other searches. For example, a search may be used individually, and/or a search may be combined with one or more other searches, by considering the trade-offs between searching accuracy and/or computation complexity. Example conditions (e.g., "predictor search only" and "hash based search needed"), such as those used in 700, may be determined using, e.g. Table 1 (and shown and/or described herein).

Figure 8:
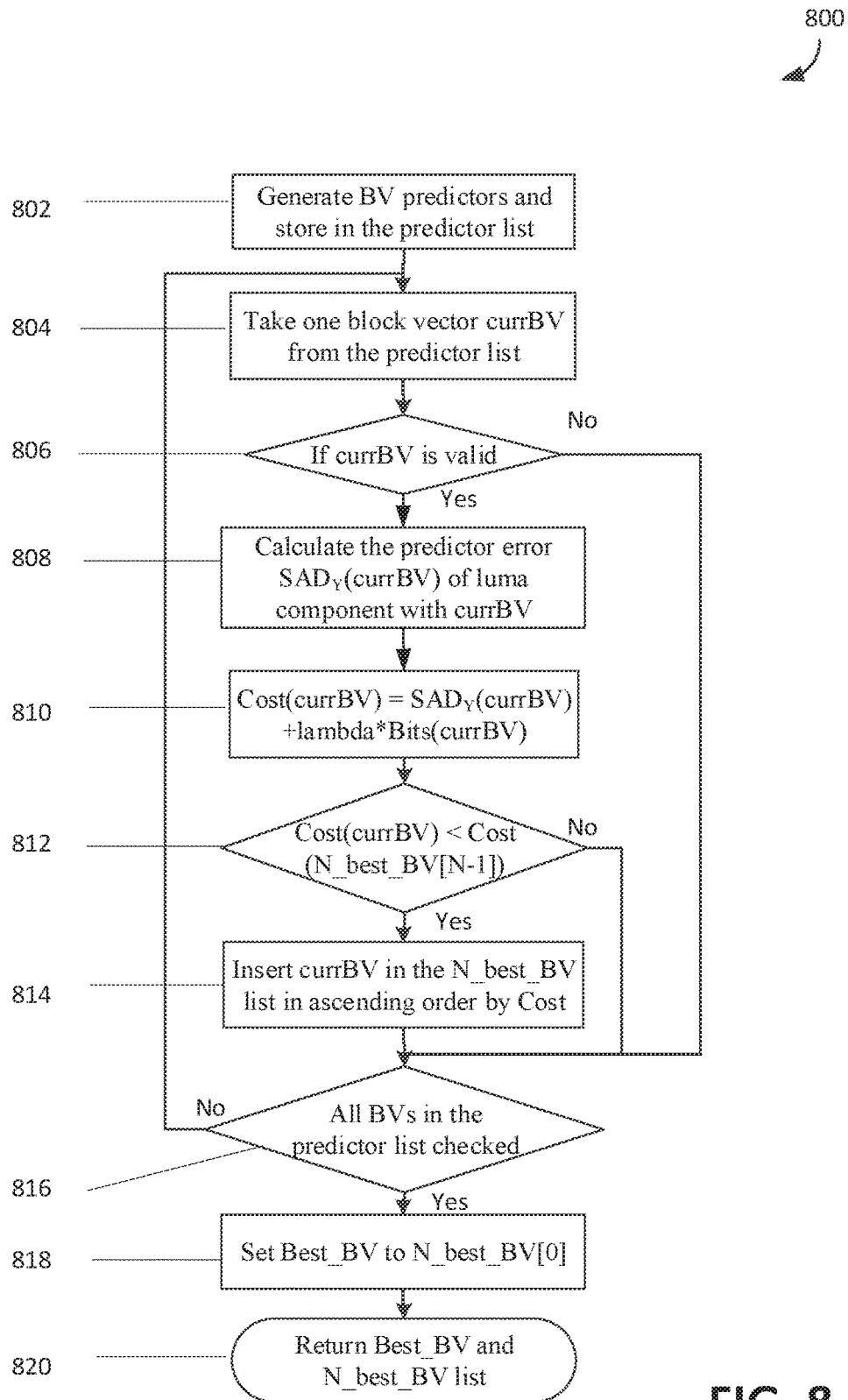
FIG. 8 illustrates an example predictor based IntraBC search.

FIG. 8 shows an example representing a predictor-based IntraBC search 800. At 802, one or more block vector ("BV") predictors may be generated and/or stored in a predictor list. The BV predictors may include BVs of a parent block, spatial neighboring BVs, and/or derived BVs. A BV from an IntraBC search may be stored for sub-block IntraBC search, e.g., as a parent BV. For example, BVs from the IntraBC search of one 16×16 block may be used as predictors for four (4) 8×8 blocks belonging to that 16×16 block. Spatial BV predictors may be block vectors of spatial neighboring PUs if they are IntraBC coded.

A BV (e.g., a current block vector. "currBV"), at 804, may be taken from the predictor list. The current block vector may be checked to determine whether it is valid (e.g., whether it may be used for current prediction unit coding), at 806. If currBV is determined to be invalid, it is determined whether other BVs in the predictor list may be checked, at 816. For example, at 816, it may be determined whether all BVs in the predictor list have been checked. If it is determined that not all BVs in the predictor list have been checked, a next BV may be examined. If the BVs in the predictor list have been checked, the most suitable may be selected. For example, the best block vector, "Best_BV," may be set equal to the best BV in a best BV list (e.g., the list "N_best_BV"), at 818. The best BV may be set equal to the most suitable (e.g., first) BV found in a list of BVs sorted by cost. The Best_BV and the N_best_BV list may be identified, at 820.

If currBV is determined to be valid, at 806, the predictor error $SAD_Y(currBV)$ of luma component with currBV may be calculated, at 808. The cost of the current BV (Cost (currBV)") may be set equal to $SAD_Y(currBV)$+ lambda*Bits(currBV), at 810. If, at 812, the cost of currBV is not smaller than the cost of last BV in the existing best BV list (Cost(currBV)>=Cost(N_best_BV[N−1])), 816 may be followed. If at 812, the cost of currBV is smaller than the cost of last BV in the existing best BV list (Cost(currBV) <Cost(N_best_BV[N−1])), the current BV (currBV) may be inserted into a list (e.g., list N_best_BV), at 814. The currBV may be inserted into a list in ascending order, e.g., by cost. If, at 816, the BVs (e.g., all BVs) in the predictor list have been checked, 818 may be followed. If not all BVs in the predictor list have not been checked. 804 may be followed.

Figure 9:
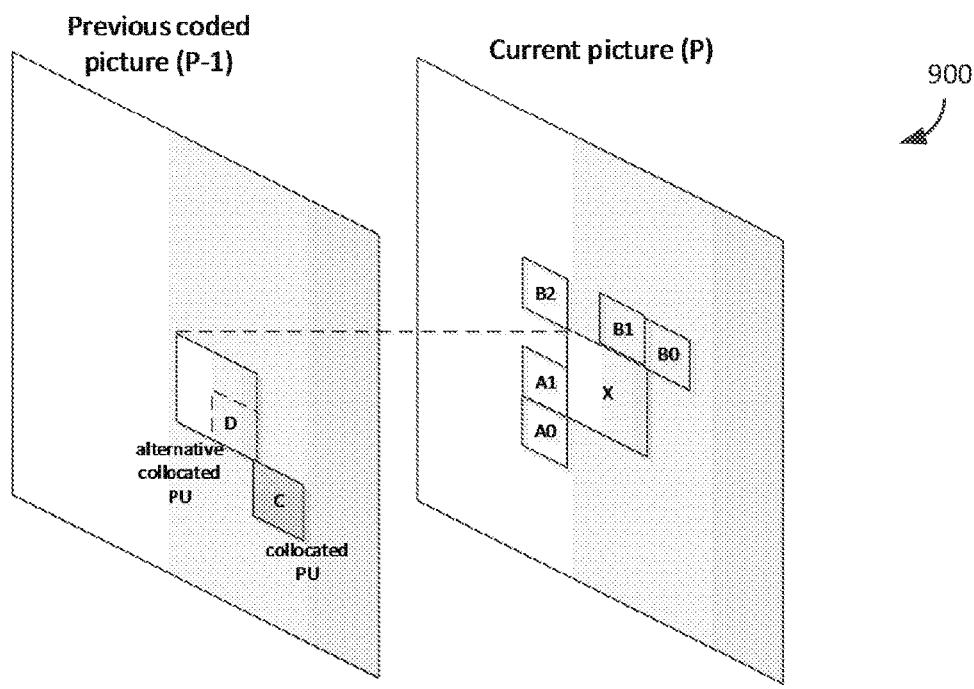
FIG. 9 illustrates example spatial and temporal motion vector (MV) predictors for inter MV prediction.

FIG. 9 illustrates example spatial and temporal motion vector ("MV") predictors ("TMVPs") for inter-MV prediction. For example, a spatial neighboring PU at position "A0", "A1", "B0", "B1" and "B2" may form spatial BV predictor candidates for a current PU "X." For a spatial predictor, a block vector derivation process may be applied. The collocated position illustrated in FIG. 9 may include a collocated position in a TMVP. The bottom right prediction unit labelled "C" in FIG. 9 may be checked first. If "C" is determined to be inside the same CTU row in a previous picture as in the current CTU row and is IntraBC coded, its BV may be used as predictor. Otherwise, an alternative collocated prediction unit, such as a center position of collocated CU, labelled "D" in FIG. 9, may be checked, e.g., to determine if it is IntraBC coded. If so, its BV may be used as a predictor. If BVs of both "C" and "D" in FIG. 9 are available, both such BVs may be used as predictors in a predictor-based search. If BVs of both "C" and "D" are not available, then no temporal BV predictor may be added. For other coding configurations, such as a random access configuration that may code pictures in a coding order that is different from the display order, the nearest (e.g., in terms of temporal distance) previous picture in the decoded picture buffer may be used. If the temporal distance of such a previous picture relative to current picture is close (e.g., the distance is smaller than a threshold) and/or the difference of quantization parameters at slice level is small (e.g., smaller than a threshold), the BV from the temporally collocated block may be used a predictor. A temporal BV predictor may be from a compressed or an uncompressed BV field. The decision to compress the BV field may be determined based on a BV accuracy requirement (e.g., the desired BV accuracy) and/or the memory storage capacity at an encoder.

Figure 10:
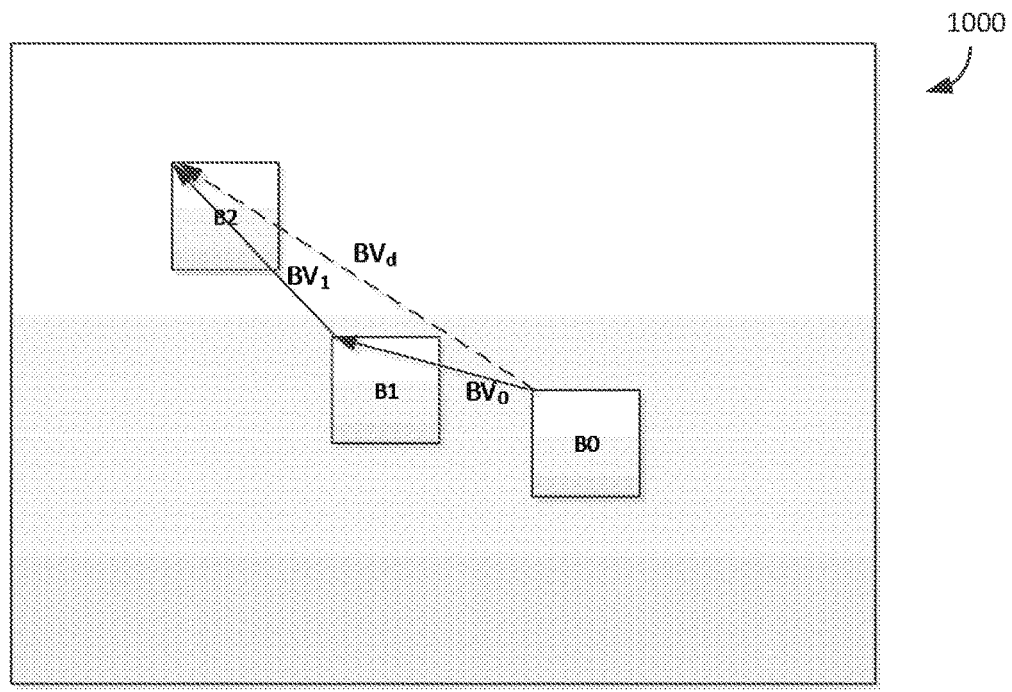
FIG. 10 illustrates an example block vector derivation.

FIG. 10 shows a simple example of a BV derivation 1000. If a reference PU of a current PU is IntraBC coded, the derived BV may equal the sum of a BV of the current PU and a BV of its reference PU. Predictor-based search 800 of FIG. 8 may identify a best BV and an ordered list of N-best BVs that may be sorted in terms of cost. The cost may be evaluated as a weighted sum of a predictor error of luma component, or a green (G) component for RGB coding, and coding bits of the identified BV.

Figure 11A:
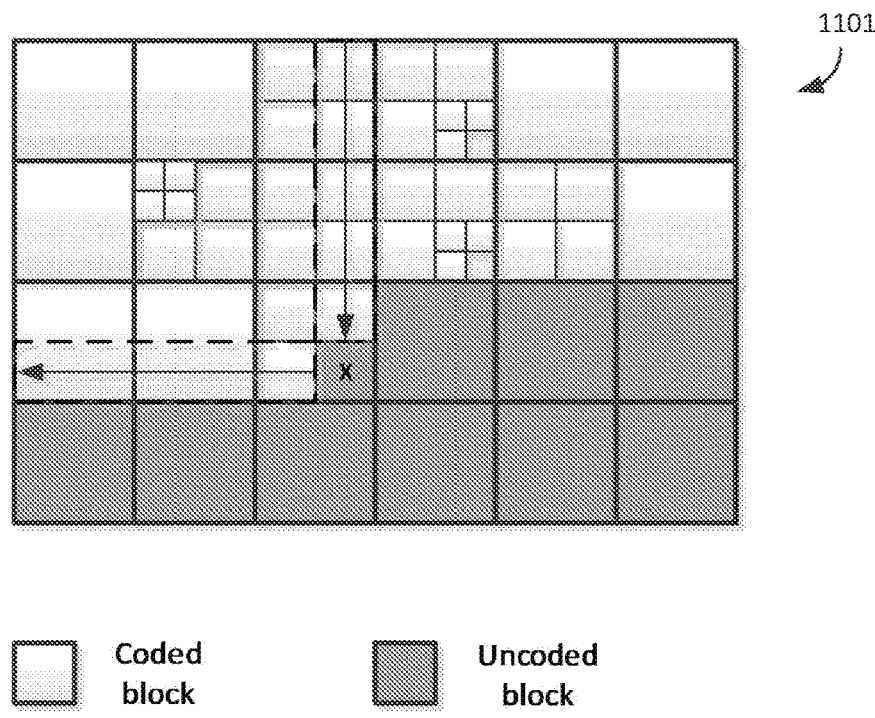
FIG. 11A illustrates an example IntraBC full frame 1-D search.
Figure 11B:
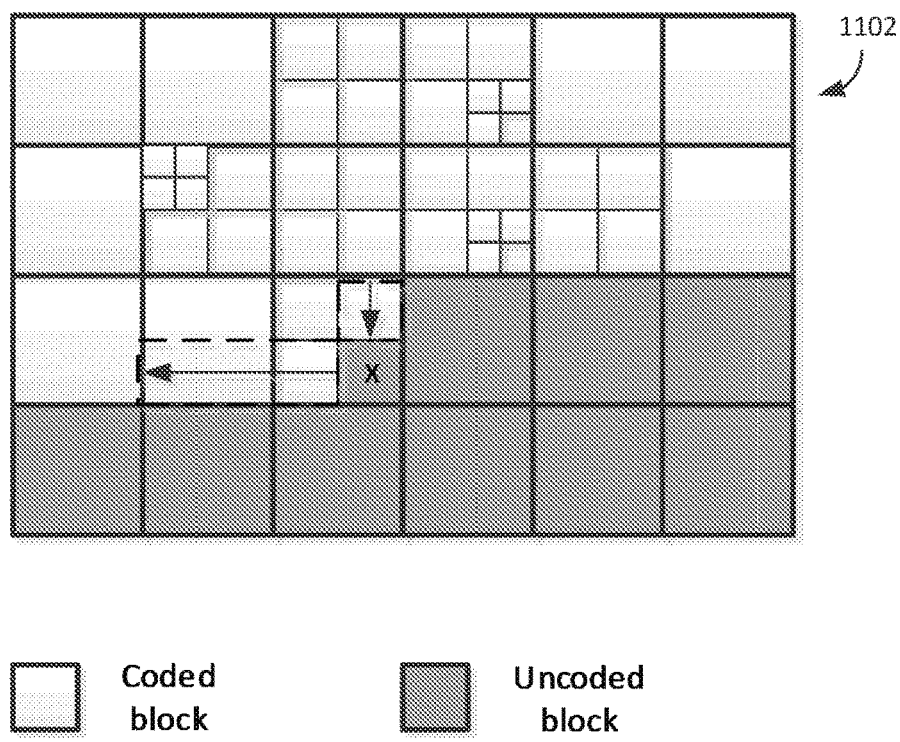
FIG. 11B illustrates an example IntraBC local 1-D search.

The list of N-best BVs may be used in an IntraBC spatial search. For example, the list of N-best BVs may be selected based on a predictor based search, such as the search shown in FIG. 8. In such a spatial search, a BV may be searched within a search window (e.g., a full frame and/or a local region), by comparing the prediction error of a luma component and/or a G component for RGB coding. A list of N-best BVs may be updated (e.g., updated in the same manner as that used in a predictor-based search). A best BV (e.g., a final best BV) may be obtained from a list of N-best BVs, e.g., by comparing the cost of the three RGB color components, where cost may be evaluated as a weighted sum of predictor error of such color components and coding bits of a BV. In a spatial search, a 1-D search may be applied, for example, in the order of the arrows shown in diagram 1101 of FIG. 11A for a full frame 1-D search and/or in the order of the arrows shown in diagram 1102 of FIG. 11B for a local 1-D search. Available block positions, e.g., from a top boundary of a search window to a current block position, may be checked in order and the reference pixels may be reconstructed. Available positions from the current block position to the left boundary of a search window may be checked in order.

Figure 12:
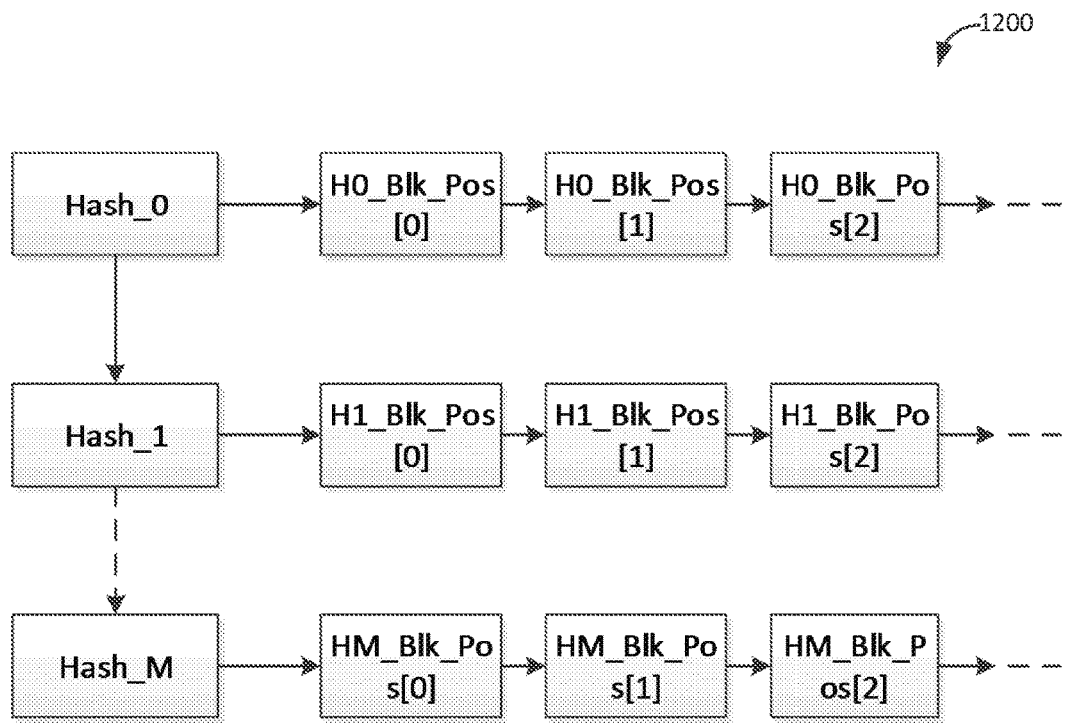
FIG. 12 illustrates example hash table for a full frame IntraBC search.

In a full frame IntraBC search, a hash-based intra-block search may be used to reduce search complexity at an encoder. A hash-based search may be used to build a set of hash-based tables for a block-size (e.g., 8×8, etc.). FIG. 12 illustrates an example hash-based table 1200. An entry in hash table 1200 may be a list that may be used to store the positions of those blocks having the same hash value. The block vector of K-th block in the list with same hash value may be calculated as follows using the following equations:

$$BV.x = Blk\_Pos[K].x - Curr\_Blk\_Pos.x \quad (1)$$

$$BV.y = Blk\_Pos[K].y - Curr\_Blk\_Pos.y \quad (2)$$

where Blk_Pos[K] may be the (x, y) coordinates of the top left corner of the K-th block and Curr_Blk_Pos may be the (x, y) coordinates of the top left corner of the current block.

Figure 13:
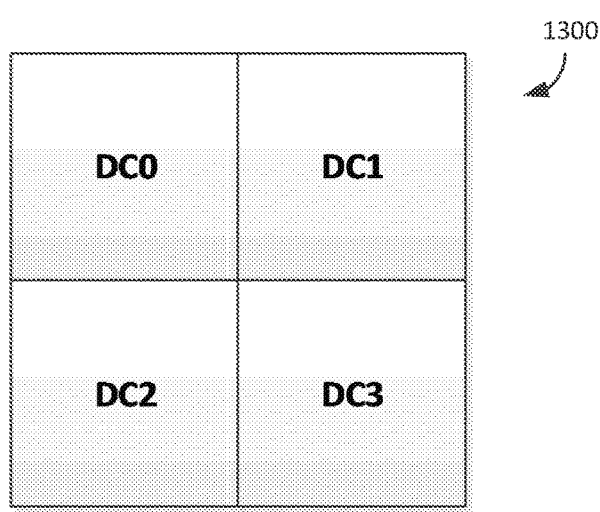
FIG. 13 illustrates example partitions for hash generation of a hash based search.

The hash value of a block may be generated based on the block's characteristics, such as a horizontal and/or a vertical gradient, direct current ("DC") information (e.g. a mean value of a signal), or a pixel's cyclic redundancy check (CRC) value. In SCM-3.0, a 16-bit hash value may be generated, e.g., based on original pixel values for 8×8 luma blocks. In equation (3) below, let Grad denote the gradient of one 8×8 block and let DC0, DC1, DC2, and DC3 denote the DC values of the four (4) 4×4 blocks inside the 8×8 block, as shown in diagram 1300 of FIG. 13. A 16-bit hash value H may be calculated as follows:

$$H = (MSB(DC0,3) << 13) + (MSB(DC1,3) << 10) + (MSB(DC2,3) << 7) + (MSB(DC3,3) << 4) + MSB(Grad,4) \quad (3)$$

where MSB(X, n) may be a function of extracting the n most significant bits of X.

In a hash-based search, there may be several processes used, independently and/or together in any combination. For example, a process may include updating a hash table during an encoding process. A process may include using a hash-based search for CU encoding. In a hash table update, after a coding tree unit (CTU) finishes encoding, the top left position of a reconstructed block (e.g., whose bottom right corner is in the CTU) may be added to a hash table based on the reconstructed block's hash value for future IntraBC coding. In a hash-based search, a current block's hash value may be calculated and a hash table may be searched, e.g., using the current block's hash value. If the current block's hash value is found in the hash table, a list of the corresponding block positions in the hash table may be used for a block vector ("BV") search. For a block position in the list of corresponding block positions, a sum of an absolute difference ("SAD") of a luma component between an original signal and a reference block may be compared to find a list of N-best block vectors with a first N having a least cost. Such a cost may be determined in the same manner as a cost is determined in spatial searches described herein. A best block vector may be determined by comparing a cost of components. For example, if a hash value of a current block is equal to Hash_1 as shown in hash table 1200 of FIG. 12, the list of block positions for Hash_1, labeled H1_blk_pos [0], H1_blk_pos[1], and so on in hash table 1200, may be searched.

Table 1 below provides example searches and search windows in terms of CU size and partition type for IntraBC search, e.g., as may be used in SCM-3.0. In order to reduce the complexity, a predictor-based search may first be applied to a 2N×2N partition. If there is no non-zero coefficient for 2N×2N IntraBC coding (which may indicate that a 2N×2N search is sufficient), then a spatial and/or hash search for a 2N×2N partition and/or an IntraBC search for other partition types (i.e., non-2N×2N) may be skipped (e.g., may not be performed). Otherwise, partitions including a 2N×2N partition with spatial search and hash-based search may be applied. A hash-based search may be applicable to a 2N×2N partition of 8×8 CU. Various block vector predictions and block vector codings may be used, e.g., to improve the BV coding efficiency.

TABLE 1

Searches and search window settings for IntraBC searches

| CU size | Partition type | Predictor based search | Spatial search | Hash based search |
|---|---|---|---|---|
| 64 × 64 | all partitions | X | X | X |
| 32 × 32 | 2N × 2N | ✓ | X | X |
|  | N × 2N, 2N × N, N × N | X | X | X |
| 16 × 16 | 2N × 2N | ✓ | ✓ Full frame 1-D search | X |
|  | N × 2N, 2N × N, N × N | X | X | X |
| 8 × 8 | 2N × 2N | ✓ | ✓ Local 1-D/ 2-D search | ✓ |
|  | N × 2N | ✓ | ✓ Full frame 1-D search | X |
|  | 2N × N | ✓ | ✓ Local 1-D/ 2-D search | X |
|  | N × N | ✓ | ✓ Local 1-D/ 2-D search | X |

(X = IntraBC search not applied, ✓ = IntraBC search applied)

IntraBC searching may use a BV predictor from temporal pictures in predictor-based searches. For example, IntraBC searching may use a BV predictor from temporal pictures. There are regions (e.g., many still regions) in screen content. A block vector of a current picture and/or a block vector of a collocated block of a previous picture may be correlated (e.g., highly correlated).

A hash generation may affect an IntraBC search. For locality sensitive hash codes, a distance in hash space (e.g., a Hamming distance) may be related to the similarity distance in a feature space. If a Hamming distance of two blocks is smaller, e.g., it may indicate that the two blocks are closer in a feature space measured by Euclid distance. It may be desirable to cluster and/or fast block match such blocks.

For RGB coding, an IntraBC spatial search may be performed in YCgCo space to improve the accuracy of a block vector, e.g., because prediction error may be checked for the luma component r of for the G component. More energy may be concentrated in a luma component than a G component, which may cause a luma signal to be sharper than a G signal. A hash generation process for hash-based search may still utilize a sample value in a G component.

Figure 14:
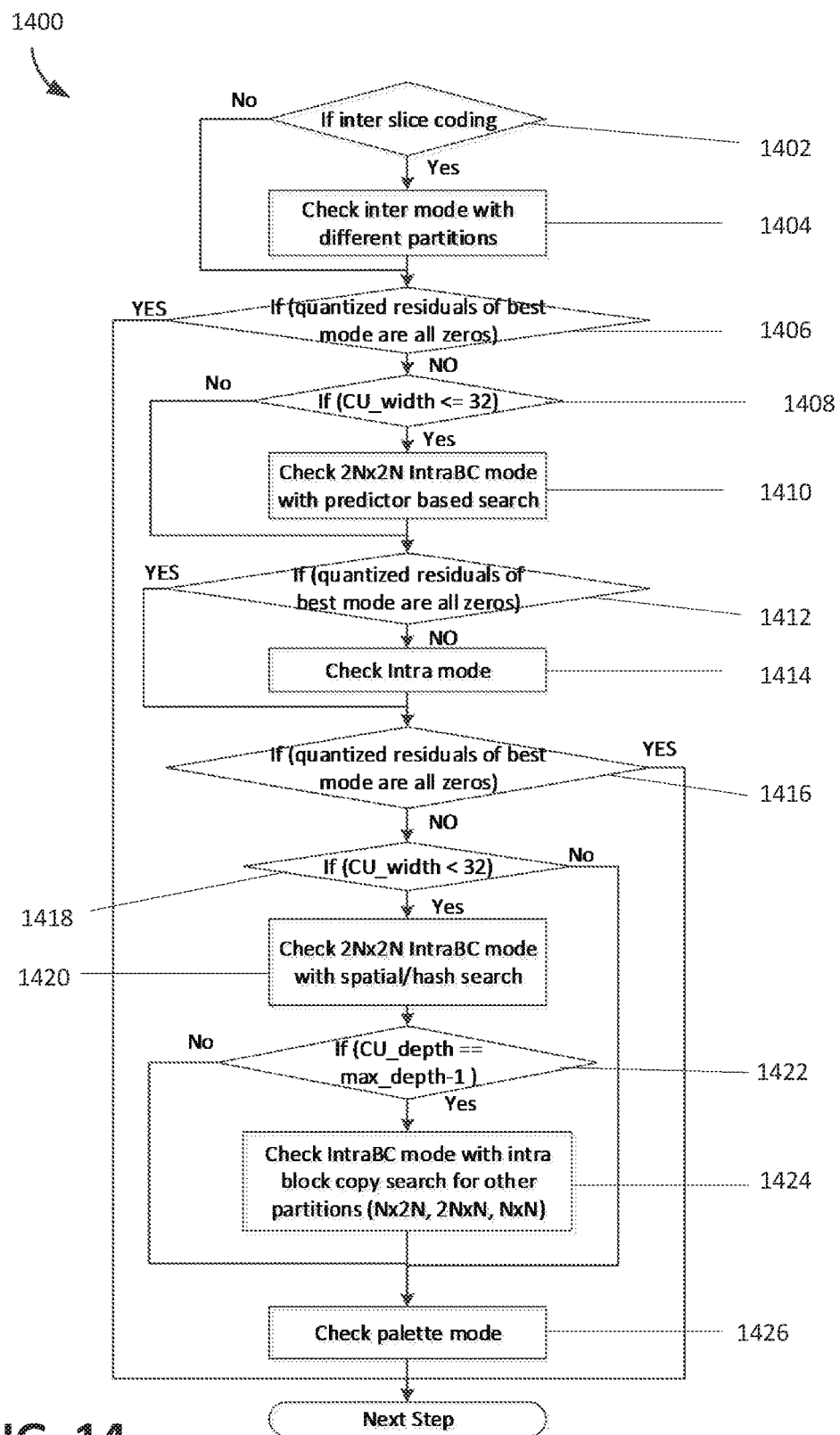
FIG. 14 illustrates an example coding unit (CU) compression without CU splitting.

FIG. 14 illustrates an example coding unit (CU) compression process. There may be early termination conditions for IntraBC mode checking, as shown in 1400. For example, early termination conditions for IntraBC mode checking may be found at 1406 and/or 1416. At 1402, it may be determined whether inter slice coding may be performed. If inter slice coding may be performed, inter mode may be checked (e.g., inter mode with different partitions may be checked, at 1404). A 2N×2N IntraBC utilizing predictor-based search and/or intra-prediction modes (e.g., in intra-slice coding) may be evaluated e.g., to determine if quantized residuals of a best mode (e.g., current best mode) are all zeros, at 1406. If quantized residuals of a best mode (e.g., current best mode) are all zeros, the remaining IntraBC coding mode(s), including a 2N×2N partition using a spatial and/or hash-based search and/or other partitions (e.g., N×2N, 2N×N, N×N) may be skipped. IntraBC may provide improved prediction compared to directional intra-prediction, e.g., because IntraBC may copy a reconstructed block and/or may not generate a prediction from neighboring pixels from a top row and a left column, as may be done in intra-predictions.

If quantized residuals of a best mode (e.g., current best mode) are not all zeros, at 1408, whether the coding unit width (e.g., "CU_width") is less than or equal to 32 may be determined. If the CU_width is less than or equal to 32, in an inter-slice coding (e.g., inter-mode), a 2N×2N IntraBC with predictor-based search and/or intra-prediction modes may be checked (e.g., checked first), at 1410. At 1412, whether quantized residuals of a best mode are all zeros may be determined. If quantized residuals of a best mode are all zeros, remaining IntraBC coding modes, including a 2N×2N partition with spatial and/or hash-based search and other partitions (e.g., N×2N, 2N×N, N×N) may not be performed, and 1416 may be followed. IntraBC coding may not signal a prediction direction (e.g., forward uni-prediction, backward uni-prediction, bi-prediction) and/or reference indices. Block vector coding may also be efficient because block vectors may use integer resolution and/or motion vectors may use quarter precision and/or integer precision. If, at 1412, it is determined that quantized residuals of a best mode are not all zeros, Intra mode may be checked, at 1414.

At 1416, it may be determined whether quantized residuals of a best mode are all zeros. If quantized residuals of a best mode are all zero, the remaining steps may be skipped. If quantized residuals of a best mode are not all zeros, it may be determined, at 1418, whether CU_width is less than 32. 1418 may be evaluated to reduce encoding complexity (e.g., to reduce complexity for N×2N and/or 2N×N partitions for large CU sizes, such as 32×32 and/or 16×16). If the CU_width is greater than or equal to 32, the palette mode may be checked at 1426. N×2N and/or 2N×N partitions for large CU sizes, (e.g., 32×32 and/or 16×16) may not be evaluated (see, e.g., Table 1 above). By not evaluating such CU sizes, coding efficiency may be reduced. Such partitions may be selectively evaluated, e.g., to minimize encoding complexity while improving coding efficiency. If CU_width is less than 32, at 1418, 2N×2N IntraBC mode may be checked, e.g., checked with spatial and/or hash searches, at 1420. It may be determined whether coding unit depth (e.g., "CU_depth") is equal to max_depth−1, at 1422. If CU_depth is not equal to max_depth−1, the palette mode may be checked, at 1426. If CU_depth is equal to max_depth−1, IntraBC mode with intra block copy search may be checked for partitions (e.g., other partitions, N×2N, 2N×N, N×N, etc.), and 1426 may be performed.

A search order of 1-D search in a vertical direction, as shown in FIG. 11, may affect search speed. In a 1-D horizontal and vertical search, if predictor error is smaller than a pre-defined threshold, a search in the associated direction may be terminated early.

One or more BV predictors from a previously coded picture may be used in IntraBC search. BV predictors may be generated in one or more ways, including from parent blocks, from spatial neighboring blocks, from reference blocks used for BV derivation, and/or from BVs from collocated blocks in a previously coded picture. For intra-coding configurations (e.g., where pictures are coded as intra-pictures), there may be a correlation (e.g., strong correlation) of BVs of a current block and/or its collocated block in the nearest coded picture, e.g., because a current picture and its previous coded picture may be close in temporal distance and/or because a current picture and/or its previous coded picture may be coded in a similar quality using similar quantization parameters. Available BVs from temporally collocated blocks, e.g., in a previous coded picture, may be added in a predictor generation process for predictor-based IntraBC search. Such predictors may be effective in such an intra-coding configuration, e.g., because such pictures may be coded in a same order as an associated display order and/or because such pictures may be quantized using similar quantization parameters. The temporally collocated positions of such pictures may be the same as a temporal motion vector prediction ("TMVP").

A hash generation for IntraBC hash-based search may be used. A hash generation may use more local features. Such local features may be calculated, e.g., based on relatively small sub-blocks and local features within the associated block may be used for hash generation. By using local features, an improved clustering of blocks may be obtained. Global features, such as gradients of such a block, may also be used in hash generation. The use of such global features may further improve clustering.

Figure 15A:
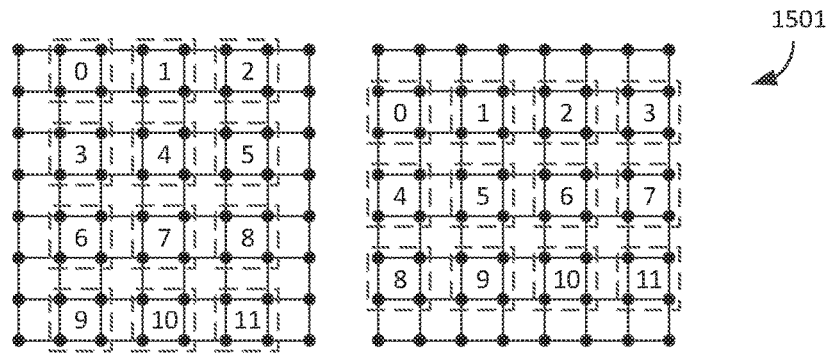
FIG. 15A illustrates example even partitions for a hash generation of a hash based search.
Figure 15B:
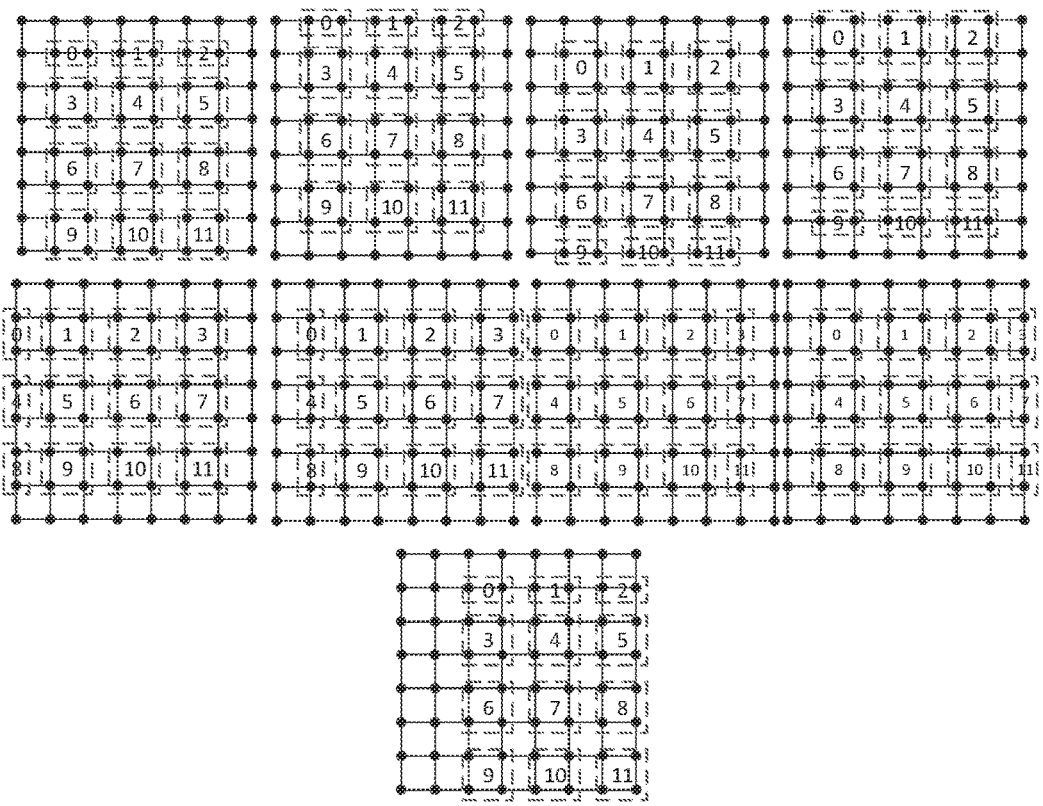
FIG. 15B illustrates example uneven partitions for a hash generation of a hash based search.

A block (e.g., an 8×8 block) may be partitioned into twelve (12) sub-blocks as shown in FIG. 15. Such partitioning may be performed in various ways, as shown in FIG. 15. For example, FIG. 15A illustrates blocks 1501 with even partitions where the sub-blocks have a same size while FIG. 15B illustrates blocks 1502 with uneven partitions where the sub-blocks are of various, different sizes.

For an i-th sub-block $SB_i$ of a block B, the associated DC value may be denoted as $DC(SB_i)$. The DC value of block B, denoted as DC(B) may then be calculated. A one (1) bit flag $F(SB_i)$ may be calculated by comparing $DC(SB_i)$ with DC(B) as shown in equation (4):

$$F(SB_i) = \begin{cases} 1, & \text{if } DC(SB_i) > DC(B) \\ 0, & \text{otherwise} \end{cases} \quad (4)$$

A 15-bit hash value of block B may be generated by combining a local feature represented by $F(SB_i)$ and a global feature represented by the gradient of the block:

$$H(B) = (\Sigma_{i=0}^{11} F(SB_i) << (i+3)) + MSB(Grad(B), 3) \quad (5)$$

Grad(B) may be gradients of the block B. MSB(X, n) may be a function of extracting the n most significant bits of the variable X. Luma value at position (x,y) may be denoted as L(x,y). For a pixel p at position (x,y), an associated gradient grad(p) may be calculated by determining and averaging the gradients in the horizontal and vertical directions:

$$grad(p) = (|L(x,y) - L(x-1,y)| + |L(x,y) - L(x,y-1)|)/2 \quad (6)$$

Grad(B) may be calculated as an average of the gradients of pixels p within the block B.

Figure 16:
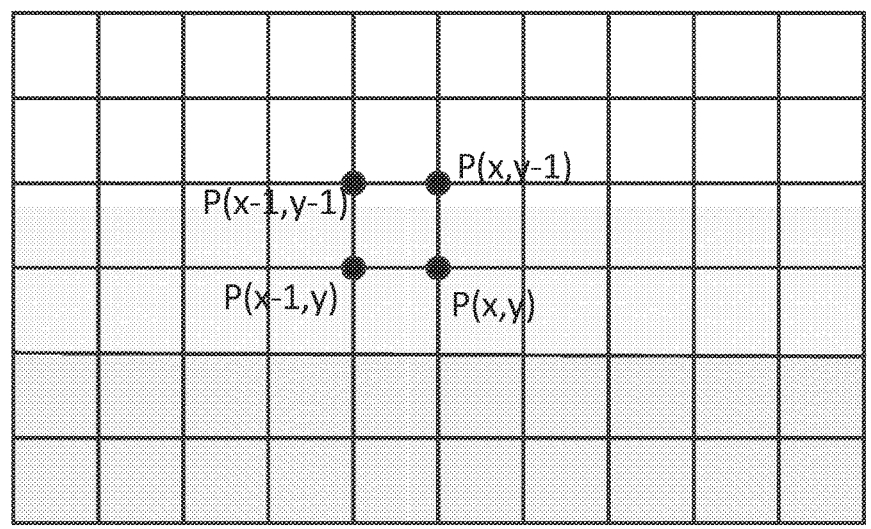
FIG. 16 illustrates an example integral image calculation.

In a hash-based search, a hash table may be generated for possible positions within a picture. The hash table may be used in such a hash-based search. The computation process of using a hash table may be accelerated by calculating (e.g., first calculating) integral images for the DC and/or gradient. An integral image may be the sum of pixel values within one or more points (e.g., within one or more points of an image and/or sub-image). For example, the integral image may be the sum of pixel values found within a rectangle surrounding a current image. The value at a given position (x,y) in the integral image is the sum of the rectangle, whose top left corner is the top left of current image, and bottom right corner is the given position (x,y). The integral image may be the sum of the pixel values of the rectangle surrounding the current image. A hash value may be calculated using the DC integral image and/or the gradient integral image. $S_I(x,y)$ may denote the integral image of signal I(x,y), which may be luminance and/or gradient. $S_I(x,y)$ may be defined to be zero, e.g., if x and/or y is negative. $S_I(x,y)$ may be calculated using I(x,y) and the neighboring locations as shown in equation (7) and as further illustrated in FIG. 16.

$$S_I(x,y) = S_I(x,y-1) + S_I(x-1,y) - S_I(x-1,y-1) + I(x,y) \quad (7)$$

Where the top left position of block B is denoted as $(X_{TL}, Y_{TL})$ and the bottom right position of block B is denoted as $(X_{BR}, Y_{BR})$, the sum of I(x,y) within block B may be calculated as follows:

$$sum(I(x,y) | (x,y) \in B) = S_I(X_{BR}, Y_{BR}) + S_I(X_{TL} - 1, Y_{TL} - 1) - S_I(X_{TL} - 1, Y_{BR}) - S_I(X_{BR}, Y_{TL} - 1) \quad (8)$$

Equation (8) may be used to calculate a DC value and a gradient of a block efficiently (e.g., more efficiently). The computation complexity for hash value generation may be reduced. Such a fast hash calculation may also be applicable to hash generation as shown in Equation (3) above.

The hash generations may be extended to a general method. A region R (e.g., a block or an ellipse) may be partitioned into multiple sub-regions SR using a partitioning rule. For a sub-region $SR_i$, a local feature $L(SR_i)$ may be calculated, for example, as DC and/or gradients within that sub-region, and/or a clipped value $F(SR_i)$ may be generated by comparing the value of the local feature $L(SR_i)$ to the value a global feature $G_0(R)$ as shown below in Equations (9) or (10). The value of the global feature may be calculated in a similar manner as that used to calculate the local feature (e.g., as DC or gradients). The value of the global feature may be evaluated over the region R. M may be a maximum value of the variable F. If F is represented by p bits, M may be set equal to $2^P - 1$ for Equation (9), whereas M may be set equal to 2p−1 for Equation (10).

$$F(SR_i) = \begin{cases} S(i) * \frac{L(SR_i)}{G_0(R)}, & \text{if } S(i) * \frac{L(SR_i)}{G_0(R)} < M \\ M, & \text{otherwise} \end{cases} \quad (9)$$

$$F(SR_i) = \begin{cases} -M, & \text{if } S(i) * (L(SR_i) - G_0(R)) < -M \\ M - 1, & \text{if } S(i) * (L(SR_i) - G_0(R)) > M - 1 \\ S(i) * (L(SR_i) - G_0(R)), & \text{otherwise} \end{cases} \quad (10)$$

Parameter S(i) may be a scaling factor for a sub-region. Such a scaling factor may be constant across regions, e.g., such that a sub-region is treated equally. Such a scaling factor may take into account a difference between a boundary area and/or a center area. For example, a center of a region may be reliable (e.g., more reliable) and/or important (e.g., more important) relative to an associated whole region. Therefore, S(i) may be larger for center sub-regions and/or smaller for boundary sub-regions. A hash value of region R, H(R) may be calculated as shown below in Equation (11):

$$H(R) = (\Sigma_{i=0}^{N} F(SR_i) << (i*p+q)) + MSB(G_1(R), q) \quad (11)$$

where p may be a number of bits for variable F and q may be a number of bits for a second global feature $G_1(R)$. The use of a second feature $G_1(R)$ may depend on the associated application. A second global feature may be omitted and/or multiple (e.g., multiple additional) global features may be included in the hash.

The hash generations may provide improved clustering capabilities due, at least in part, to the use of local features extracted from sub-blocks. Such hash generations may be used by a variety of applications, e.g., because the computation complexity required by the disclosed methods is low (e.g., relatively low) due to the fast implementation approach described herein that utilizes one or more integral images.

Figure 18:
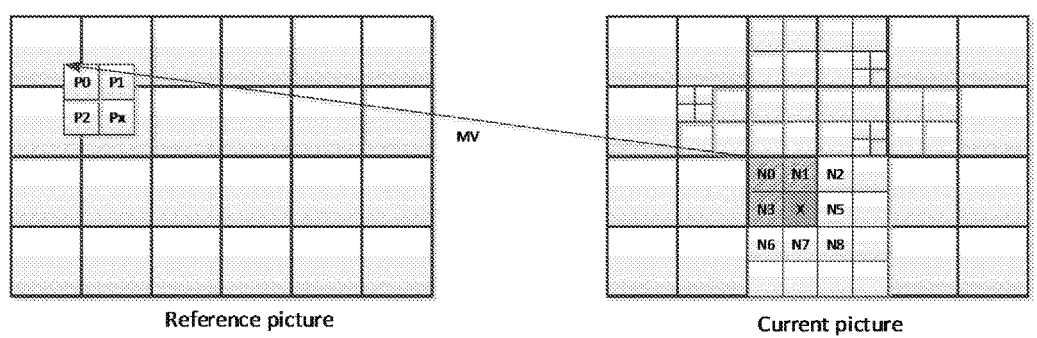
FIG. 18 illustrates example inter-prediction based error concealment.

The lower complexity hash generation may be utilized in clustering and/or patch/block matching related applications. For example, the disclosed systems and/or methods may be used for error concealment. In FIG. 18, a block "X" may be corrupted due to transmission errors. Error concealments may fill corrupted block "X" with intra-prediction and/or inter-prediction. Intra-predictions may fill the corrupted block with a directional prediction, which may be analyzed from the block's left and/or top neighboring pixels. Inter-predictions may perform motion estimation using the corrupted block's neighboring blocks as target blocks. For example, in FIG. 18, the top neighboring block N1, the top left neighboring block N0, and the left neighboring block N3 may be used as targets to find corresponding blocks P1, P0, and P2. The block Px in the reference picture may be used to fill block X. The hash based search using the disclosed hash generations may be used for fast matching. The hash code may be generated using neighboring blocks (e.g., N0, . . . , N8) of the block to be corrected.

A block matching related application may be used for point matching in 3D and/or multi-view processing, such as view synthesis and/or depth estimation. A corresponding point in another view may be found when one feature point in a first view is available. Hash-based matching using hash generations may be applicable. For fast face detection, there may be a weak classifier that may be used to remove samples (e.g., unlikely samples) at a stage (e.g., an early stage) of such a process. The samples that pass the weak classifier may be verified by one or more classifiers that may be cascaded. The early removal weak classifier may be trained in the hash space where the hash value is generated using the disclosed methods, reducing the complexity at an early stage of processing, e.g., making face detection faster.

IntraBC search may be used for RGB coding. Where encoding is performed using the RGB format, the color spaces used in spatial search and/or hash-based search may be different. Spatial search may use a YCgCo space, while hash-based search may use an RGB color space. A YCgCo color space may be used for spatial and/or hash-based search, as the luma (Y) component may represent more critical (e.g., high frequency, edge, texture, etc.) information than the G component.

IntraBC search early termination may be used. A 2N×2N partitioned IntraBC with spatial/hash search and/or non-2N×2N partitioned IntraBC may be avoided, e.g., if quantized residuals are zeros (e.g., all zeros). An early termination condition may be too aggressive and/or may degrade coding efficiency. If the best mode before spatial/hash search and/or before non-2N×2N partition search is IntraBC (with 2N×2N partition using predictor based search) with residuals being equal to zeroes (e.g., all zeros) and/or inter-skip mode, the remaining IntraBC search with partitions (e.g., different partitions) may be skipped. If the best mode before spatial/hash search and/or before non-2N×2N partition search is the intra-prediction mode and/or the non-merge inter-mode, the remaining spatial/hash search and/or non-2N×2N partition searches may still be conducted. If the best mode before spatial/hash search and/or before non-2N×2N partition search is the intra-prediction mode and/or the non-merge inter-mode, coding efficiency may be improved.

Figure 19:
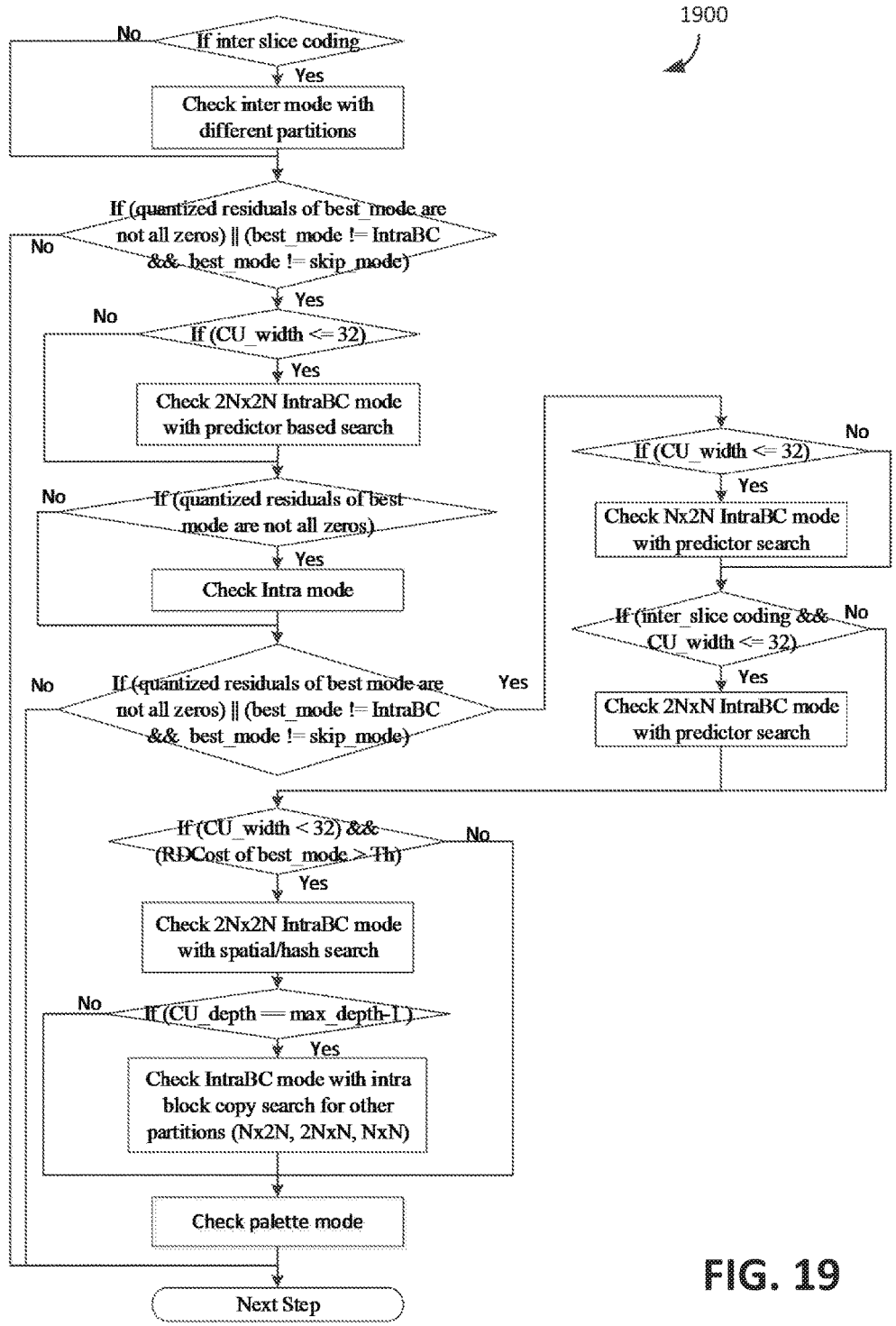
FIG. 19 illustrates an example CU compression without CU splitting.

FIG. 19 illustrates 1900 for implementing an example where the remaining spatial/hash search and/or non-2N×2N partition searches may be conducted (e.g., may still be conducted).

As shown in Table 1, N×2N and 2N×N partitions may not be checked for large CU sizes (e.g., 32×32, 16×16) due to encoding complexity considerations. Such partitions may be checked using predictor-based search for large CU sizes, which may improve coding efficiency without increasing (e.g., significantly increasing) complexity. For intra-slice coding, N×2N partitions may be checked for 32×32 CU, e.g., using predictor-based search before spatial/hash-based 2N×2N IntraBC checking. A 2N×N partition for a CU (e.g., a large CU) may not be checked for intra-slice coding. For inter-slice coding, N×2N and/or 2N×N partitions may be checked using, e.g., predictor-based search. For example, FIG. 19 checks whether (quantized residuals of best mode are not all zeros) or whether (best mode is not equal to IntraBC and best mode is not equal to skip mode). If (quantized residuals of best mode are not all zeros) or (best mode is not equal to IntraBC and best mode is not equal to skip mode), it is checked whether CU_width is less than or equal to 32. If CU_width is less than or equal to 32, N×2N IntraBC mode is checked with predictor search. If (inter_slice coding is false) and CU_width is less than or equal to 32, 2N×N IntraBC mode is checked with predictor search. After N×2N and/or 2N×N checking, the rate distortion cost (RDCost) of a best mode so far may be compared to a predefined threshold (Th). If the rate distortion cost is smaller than the threshold, other IntraBC modes checking may be skipped. Example searches for IntraBC search are listed below in Table 2.

TABLE 2

Searches and search window settings for IntraBC searches

| CU size | Partition type | Predictor based search | Spatial search | Hash based search |
|---|---|---|---|---|
| 64 × 64 | all partitions | X | X | X |
| 32 × 32 | 2N × 2N | ✓ | X | X |
| | N × 2N | ✓ | X | X |
| | 2N × N | ✓ for inter slice coding only | X | X |
| | N × N | X | X | X |
| 16 × 16 | 2N × 2N | ✓ | ✓ Full frame 1-D search | X |
| | N × 2N | ✓ for inter slice coding only | X | X |
| | 2N × N | ✓ for inter slice coding only | X | X |
| | N × N | X | X | X |
| 8 × 8 | 2N × 2N | ✓ | ✓ Local 1-D/ 2-D search | ✓ |
| | N × 2N | ✓ | ✓ Full frame 1-D search | X |
| | 2N × N | ✓ | ✓ Local 1-D/ 2-D search | X |
| | N × N | ✓ | ✓ Local 1-D/ 2-D search | X |

(X = IntraBC search not applied, ✓ = IntraBC search applied)

Figure 17:
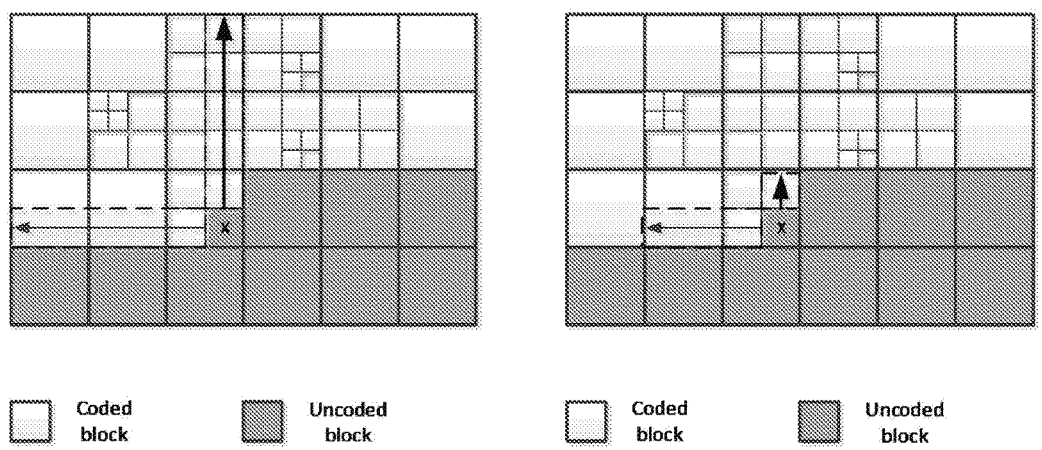
FIG. 17 illustrates an example intra-block 1-D search.

The vertical search order for 1-D spatial search may be modified. In FIG. 11, the search order may be from a top boundary to a current block position. In FIG. 17, the search order may be reversed. For example, the search order may be modified (e.g., reversed, such as the search order may be from a current block position to a top boundary). The search order may be reversed, for example, because the best matched block may more likely be close to the current block. The search may be performed from a current block position to a top boundary of a picture, allowing the location of a matched block earlier and/or potentially terminating the vertical IntraBC search earlier, which may save encoding time.

Figure 20A:
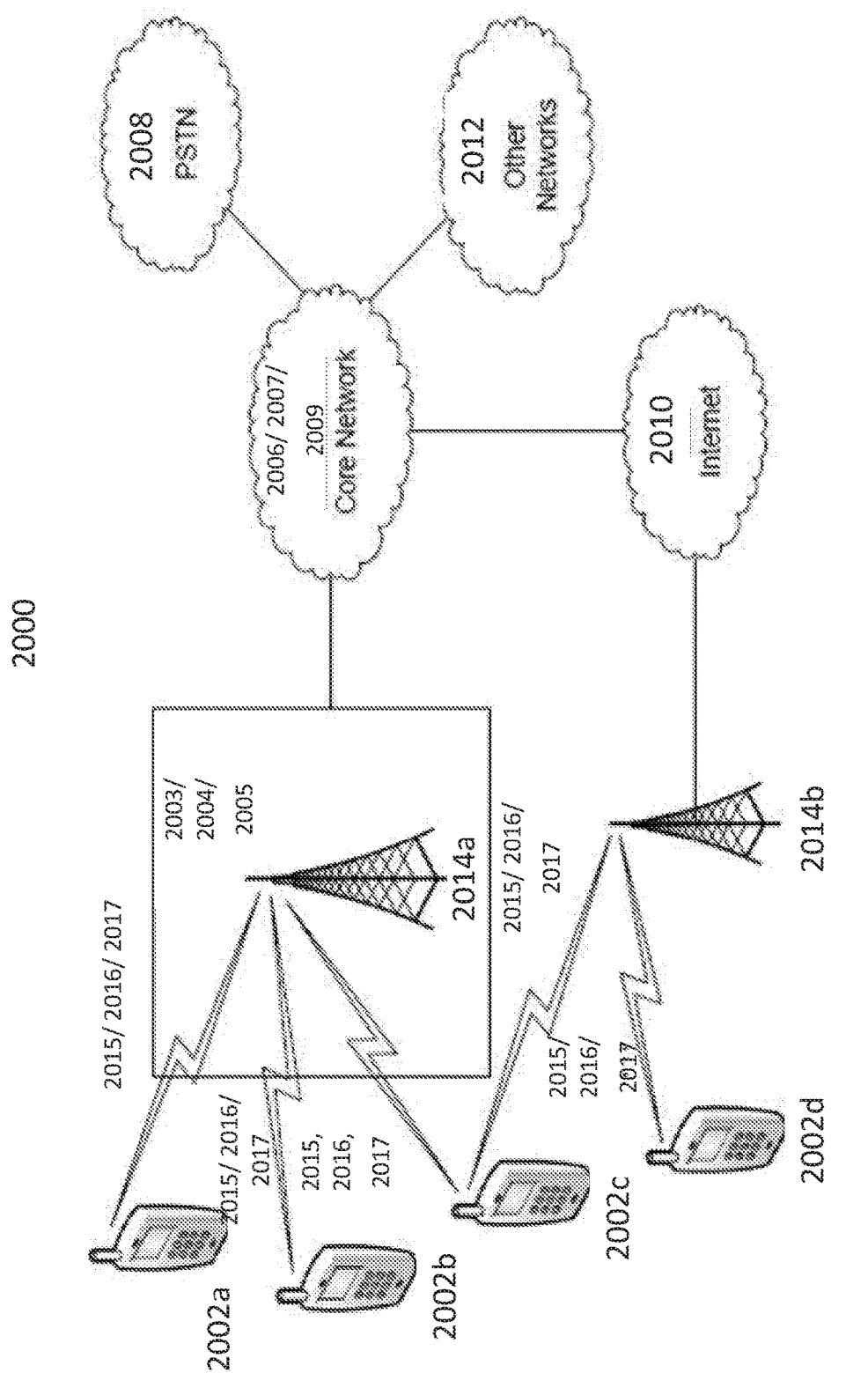
FIG. 20A is a system diagram of an example communications system in which one or more disclosed embodiments may be implemented.

FIG. 20A is a diagram of an example communications system 2000. The communications system 2000 may be a multiple access system. e.g., that provides content, such as voice, data, video, messaging, broadcast, etc., to multiple wireless users. The communications system 2000 may enable multiple wireless users to access such content through the sharing of system resources, including wireless bandwidth. For example, the communications systems 2000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 20A, the communications system 2000 may include wireless transmit/receive units (WTRUs) 2002a, 2002b, 2002c, and/or 2002d (which generally or collectively may be referred to as WTRU 2002), a radio access network (RAN) 2003/2004/2005, a core network 2006/2007/2009, a public switched telephone network (PSTN) 2008, the Internet 2010, and other networks 2012, though it will be appreciated that the disclosed embodiments contemplate any number of WTRUs, base stations, networks, and/or network elements. Each of the WTRUs 2002a, 2002b, 2002c, 2002d may be any type of device configured to operate and/or communicate in a wireless environment. By way of example, the WTRUs 2002a, 2002b, 2002c, 2002d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2000 may also include a base station 2014a and a base station 2014b. Each of the base stations 2014a, 2014b may be any type of device configured to wirelessly interface with at least one of the WTRUs 2002a, 2002b, 2002c, 2002d to facilitate access to one or more communication networks, such as the core network 2006/2007/2009, the Internet 2010, and/or the networks 2012. By way of example, the base stations 2014a, 2014b may be a base transceiver station (BTS), a Node-B, an eNode B, a Home Node B, a Home eNode B, a site controller, an access point (AP), a wireless router, and the like. While the base stations 2014a, 2014b are each depicted as a single element, it will be appreciated that the base stations 2014a, 2014b may include any number of interconnected base stations and/or network elements.

The base station 2014a may be part of the RAN 2003/2004/2005, which may also include other base stations and/or network elements (not shown), such as a base station controller (BSC), a radio network controller (RNC), relay nodes, etc. The base station 2014a and/or the base station 2014b may be configured to transmit and/or receive wireless signals within a particular geographic region, which may be referred to as a cell (not shown). The cell may further be divided into cell sectors. For example, the cell associated with the base station 2014a may be divided into three sectors. Thus, in one embodiment, the base station 2014a may include three transceivers, i.e., one for each sector of the cell. In another embodiment, the base station 2014a may employ multiple-input multiple output (MIMO) technology and, therefore, may utilize multiple transceivers for each sector of the cell.

The base stations 2014a, 2014b may communicate with one or more of the WTRUs 2002a, 2002b. 2002c, 2002d over an air interface 2015/2016/2017, which may be any suitable wireless communication link (e.g., radio frequency (RF), microwave, infrared (IR), ultraviolet (UV), visible light, etc.). The air interface 2015/2016/2017 may be established using any suitable radio access technology (RAT).

More specifically, as noted above, the communications system 2000 may be a multiple access system and may employ one or more channel access schemes, such as CDMA, TDMA, FDMA, OFDMA, SC-FDMA, and the like. For example, the base station 2014a in the RAN 2003/2004/2005 and the WTRUs 2002a, 2002b, 2002c may implement a radio technology such as Universal Mobile Telecommunications System (UMTS) Terrestrial Radio Access (UTRA), which may establish the air interface 2015/2016/2017 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 2014a and the WTRUs 2002a, 2002b, 2002c may implement a radio technology such as Evolved UMTS Terrestrial Radio Access (E-UTRA), which may establish the air interface 2015/2016/2017 using Long Term Evolution (LTE) and/or LTE-Advanced (LTE-A).

The base station 2014a and the WTRUs 2002a, 2002b, 2002c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 2014b in FIG. 20A may be a wireless router, Home Node B, Home eNode B, or access point, for example, and may utilize any suitable RAT for facilitating wireless connectivity in a localized area, such as a place of business, a home, a vehicle, a campus, and the like. The base station 2014b and the WTRUs 2002c, 2002d may implement a radio technology such as IEEE 802.11 to establish a wireless local area network (WLAN). The base station 2014b and the WTRUs 2002c, 2002d may implement a radio technology such as IEEE 802.15 to establish a wireless personal area network (WPAN). The base station 2014b and the WTRUs 2002c, 2002d may utilize a cellular-based RAT (e.g., WCDMA, CDMA2000, GSM, LTE, LTE-A, etc.) to establish a picocell or femtocell. As shown in FIG. 20A, the base station 2014b may have a direct connection to the Internet 2010. Thus, the base station 2014b may not be required to access the Internet 2010 via the core network 2006/2007/2009.

The RAN 2003/2004/2005 may be in communication with the core network 2006/2007/2009, which may be any type of network configured to provide voice, data, applications, and/or voice over internet protocol (VoIP) services to one or more of the WTRUs 2002a, 2002b, 2002c, 2002d. For example, the core network 2006/2007/2009 may provide call control, billing services, mobile location-based services, pre-paid calling, Internet connectivity, video distribution, etc., and/or perform high-level security functions, such as user authentication. Although not shown in FIG. 20A, it will be appreciated that the RAN 2003/2004/2005 and/or the core network 2006/2007/2009 may be in direct or indirect communication with other RANs that employ the same RAT as the RAN 2003/2004/2005 or a different RAT. For example, in addition to being connected to the RAN 2003/2004/2005, which may be utilizing an E-UTRA radio technology, the core network 2006/2007/2009 may also be in communication with another RAN (not shown) employing a GSM radio technology.

The core network 2006/2007/2009 may also serve as a gateway for the WTRUs 2002a, 2002b, 2002c, 2002d to access the PSTN 2008, the Internet 2010, and/or other networks 2012. The PSTN 2008 may include circuit-switched telephone networks that provide plain old telephone service (POTS). The Internet 2010 may include a global system of interconnected computer networks and devices that use common communication protocols, such as the transmission control protocol (TCP), user datagram protocol (UDP) and the internet protocol (IP) in the TCP/IP internet protocol suite. The networks 2012 may include wired or wireless communications networks owned and/or operated by other service providers. For example, the networks 2012 may include another core network connected to one or more RANs, which may employ the same RAT as the RAN 2003/2004/2005 or a different RAT.

Some or all of the WTRUs 2002a, 2002b, 2002c, 2002d in the communications system 2000 may include multi-mode capabilities, i.e., the WTRUs 2002a, 2002b, 2002c, 2002d may include multiple transceivers for communicating with different wireless networks over different wireless links. For example, the WTRU 2002c shown in FIG. 20A may be configured to communicate with the base station 2014a, which may employ a cellular-based radio technology, and with the base station 2014b, which may employ an IEEE 802 radio technology.

Figure 20B:
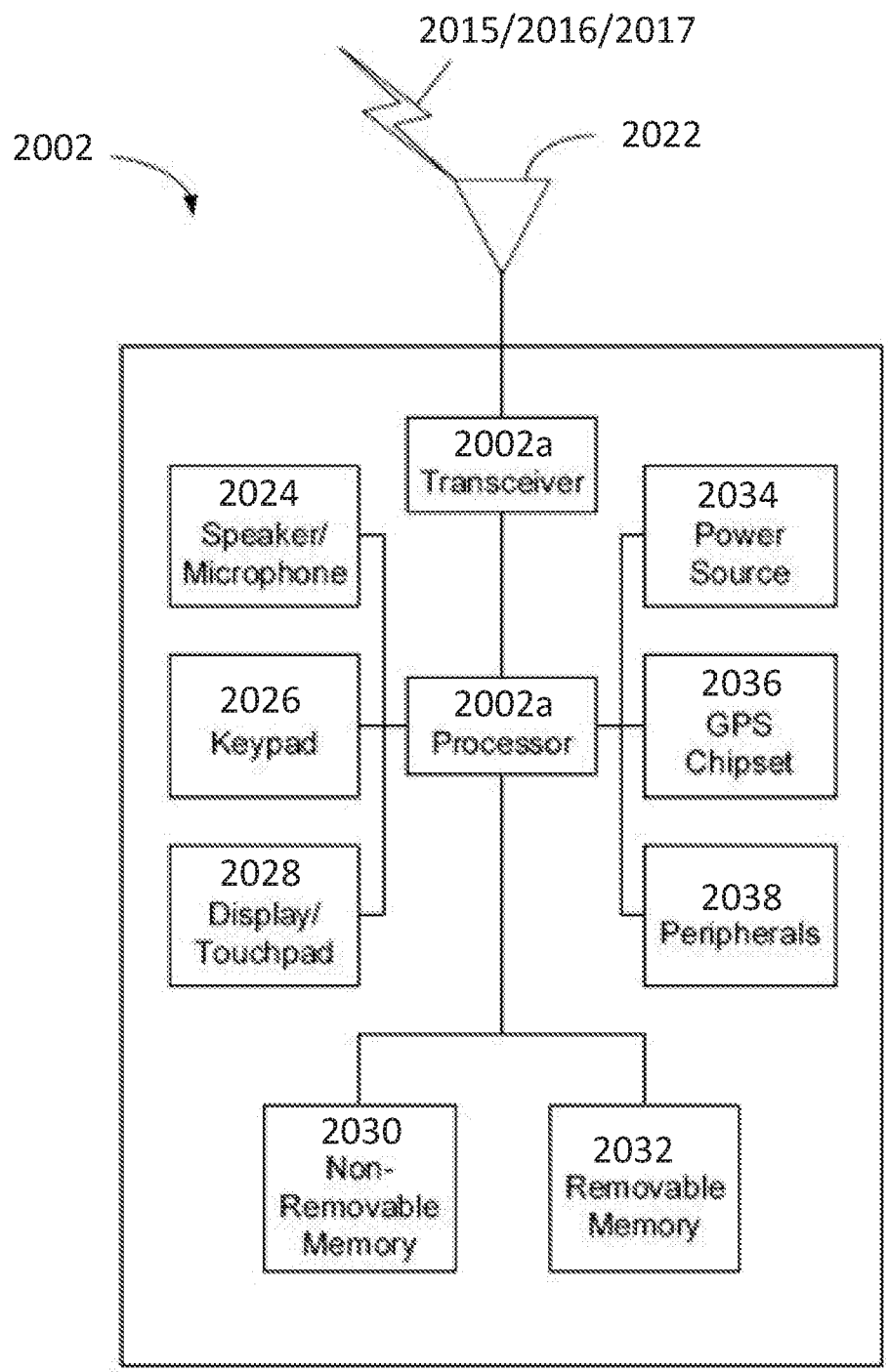
FIG. 20B is a system diagram of an example wireless transmit/receive unit (WTRU) that may be used within the communications system illustrated in FIG. 20A.

FIG. 20B is a system diagram of an example WTRU 2002. As shown in FIG. 20B, the WTRU 2002 may include a processor 2018, a transceiver 2020, a transmit/receive element 2022, a speaker/microphone 2024, a keypad 2026, a display/touchpad 2028, non-removable memory 2030, removable memory 2032, a power source 2034, a global positioning system (GPS) chipset 2036, and other peripherals 2038. It will be appreciated that the WTRU 2002 may include any sub-combination of the foregoing elements. The base stations 2014a and 2014b, and/or the nodes that base stations 2014a and 2014b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 20B and described herein.

The processor 2018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2018 may perform signal coding, data processing, power control, input/output processing, and/or any other functionality that enables the WTRU 2002 to operate in a wireless environment. The processor 2018 may be coupled to the transceiver 2020, which may be coupled to the transmit/receive element 2022. While FIG. 20B depicts the processor 2018 and the transceiver 2020 as separate components, it will be appreciated that the processor 2018 and the transceiver 2020 may be integrated together in an electronic package or chip.

The transmit/receive element 2022 may be configured to transmit signals to, or receive signals from, a base station (e.g., the base station 2014a) over the air interface 2015/2016/2017. For example, the transmit/receive element 2022 may be an antenna configured to transmit and/or receive RF signals. The transmit/receive element 2022 may be an emitter/detector configured to transmit and/or receive IR. UV, or visible light signals, for example. The transmit/receive element 2022 may be configured to transmit and receive both RF and light signals. It will be appreciated that the transmit/receive element 2022 may be configured to transmit and/or receive any combination of wireless signals.

In addition, although the transmit/receive element 2022 is depicted in FIG. 20B as a single element, the WTRU 2002 may include any number of transmit/receive elements 2022. More specifically, the WTRU 2002 may employ MIMO technology. The WTRU 2002 may include two or more transmit/receive elements 2022 (e.g., multiple antennas) for transmitting and receiving wireless signals over the air interface 2015/2016/2017.

The transceiver 2020 may be configured to modulate the signals that are to be transmitted by the transmit/receive element 2022 and to demodulate the signals that are received by the transmit/receive element 2022. As noted above, the WTRU 2002 may have multi-mode capabilities. Thus, the transceiver 2020 may include multiple transceivers for enabling the WTRU 2002 to communicate via multiple RATs, such as UTRA and IEEE 802.11, for example.

The processor 2018 of the WTRU 2002 may be coupled to, and may receive user input data from, the speaker/microphone 2024, the keypad 2026, and/or the display/touchpad 2028 (e.g., a liquid crystal display (LCD) display unit or organic light-emitting diode (OLED) display unit). The processor 2018 may also output user data to the speaker/microphone 2024, the keypad 2026, and/or the display/touchpad 2028. In addition, the processor 2018 may access information from, and store data in, any type of suitable memory, such as the non-removable memory 2030 and/or the removable memory 2032. The non-removable memory 2030 may include random-access memory (RAM), read-only memory (ROM), a hard disk, or any other type of memory storage device. The removable memory 2032 may include a subscriber identity module (SIM) card, a memory stick, a secure digital (SD) memory card, and the like. The processor 2018 may access information from, and store data in, memory that is not physically located on the WTRU 2002, such as on a server or a home computer (not shown).

The processor 2018 may receive power from the power source 2034, and may be configured to distribute and/or control the power to the other components in the WTRU 2002. The power source 2034 may be any suitable device for powering the WTRU 2002. For example, the power source 2034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2018 may also be coupled to the GPS chipset 2036, which may be configured to provide location information (e.g., longitude and latitude) regarding the current location of the WTRU 2002. In addition to, or in lieu of, the information from the GPS chipset 2036, the WTRU 2002 may receive location information over the air interface 2015/2016/2017 from a base station (e.g., base stations 2014a, 2014b) and/or determine its location based on the timing of the signals being received from two or more nearby base stations. It will be appreciated that the WTRU 2002 may acquire location information by way of any suitable location-determination method.

The processor 2018 may further be coupled to other peripherals 2038, which may include one or more software and/or hardware modules that provide additional features, functionality, and/or wired or wireless connectivity. For example, the peripherals 2038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20C:
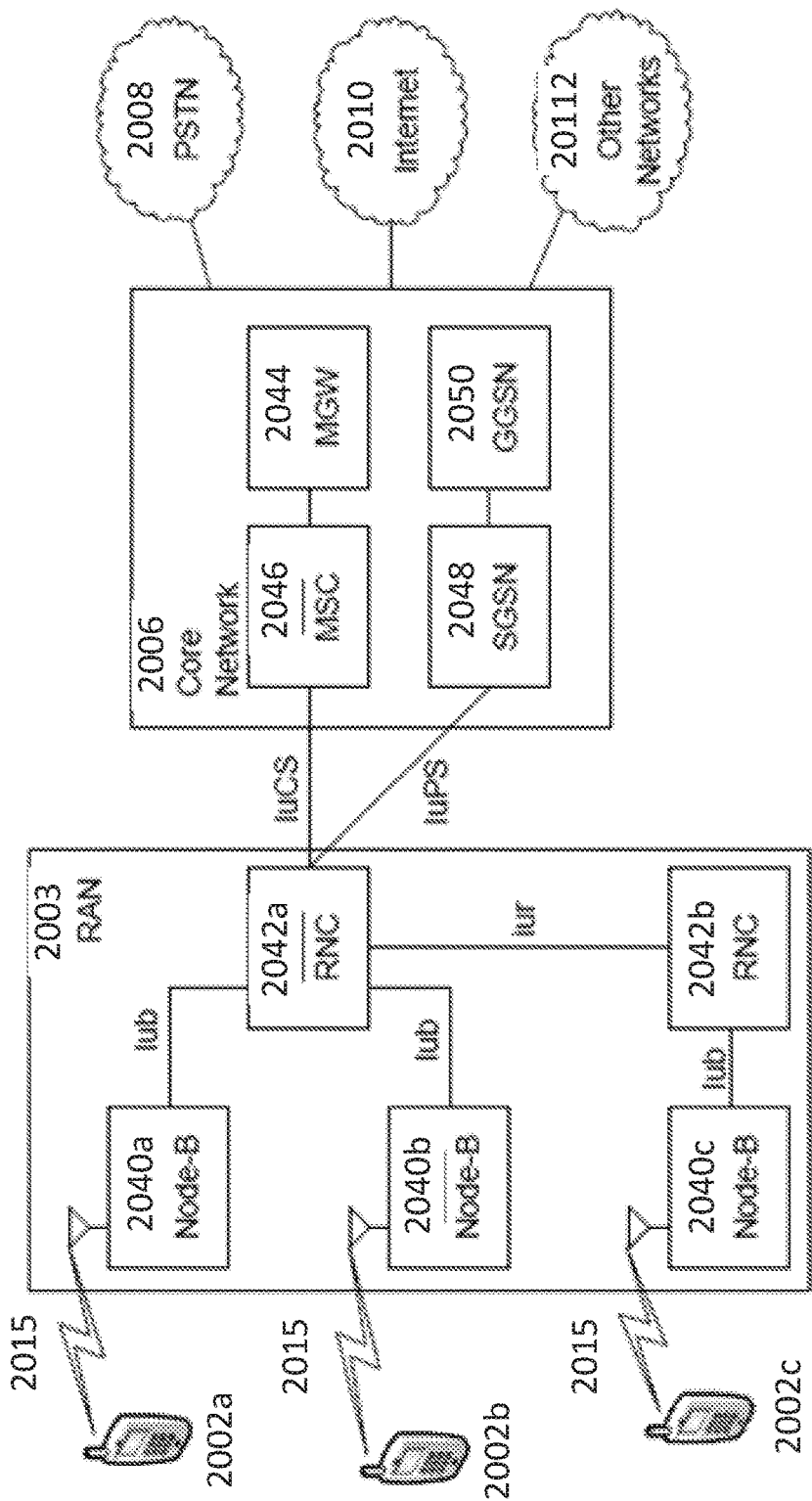
FIG. 20C is a system diagram of an example radio access network and an example core network that may be used within the communications system illustrated in FIG. 20A.

FIG. 20C is a system diagram of the RAN 2003 and the core network 2006. As noted above, the RAN 2003 may employ a UTRA radio technology to communicate with the WTRUs 2002a, 2002b, 2002c over the air interface 2015. The RAN 2003 may also be in communication with the core network 2006. As shown in FIG. 20C, the RAN 2003 may include Node-Bs 2040a, 2040b, 2040c, which may each include one or more transceivers for communicating with the WTRUs 2002a, 2002b, 2002c over the air interface 2015. The Node-Bs 2040a, 2040b, 2040c may each be associated with a particular cell (not shown) within the RAN 2003. The RAN 2003 may also include RNCs 2042a, 2042b. It will be appreciated that the RAN 2003 may include any number of Node-Bs and RNCs.

As shown in FIG. 20C, the Node-Bs 2040a. 2040b may be in communication with the RNC 2042a. Additionally, the Node-B 2040c may be in communication with the RNC 2042b. The Node-Bs 2040a, 2040b, 2040c may communicate with the respective RNCs 2042a, 2042b via an Iub interface. The RNCs 2042a, 2042b may be in communication with one another via an Iur interface. Each of the RNCs 2042a, 2042b may be configured to control the respective Node-Bs 2040a, 2040b, 2040c to which it is connected. In addition, each of the RNCs 2042a, 2042b may be configured to carry out or support other functionality, such as outer loop power control, load control, admission control, packet scheduling, handover control, macrodiversity, security functions, data encryption, and the like.

The core network 2006 shown in FIG. 20C may include a media gateway (MGW) 2044, a mobile switching center (MSC) 2046, a serving GPRS support node (SGSN) 2048, and/or a gateway GPRS support node (GGSN) 2050. While each of the foregoing elements are depicted as part of the core network 2006, it will be appreciated that any one of these elements may be owned and/or operated by an entity other than the core network operator.

The RNC 2042a in the RAN 2003 may be connected to the MSC 2046 in the core network 2006 via an IuCS interface. The MSC 2046 may be connected to the MGW 2044. The MSC 2046 and the MGW 2044 may provide the WTRUs 2002a. 2002b, 2002c with access to circuit-switched networks, such as the PSTN 2008, to facilitate communications between the WTRUs 2002a, 2002b, 2002c and traditional land-line communications devices.

The RNC 2042a in the RAN 2003 may also be connected to the SGSN 2048 in the core network 2006 via an IuPS interface. The SGSN 2048 may be connected to the GGSN 2050. The SGSN 2048 and the GGSN 2050 may provide the WTRUs 2002a, 2002b, 2002c with access to packet-switched networks, such as the Internet 2010, to facilitate communications between and the WTRUs 2002a, 2002b, 2002c and IP-enabled devices.

As noted above, the core network 2006 may also be connected to the networks 2012, which may include other wired or wireless networks that are owned and/or operated by other service providers.

Figure 20D:
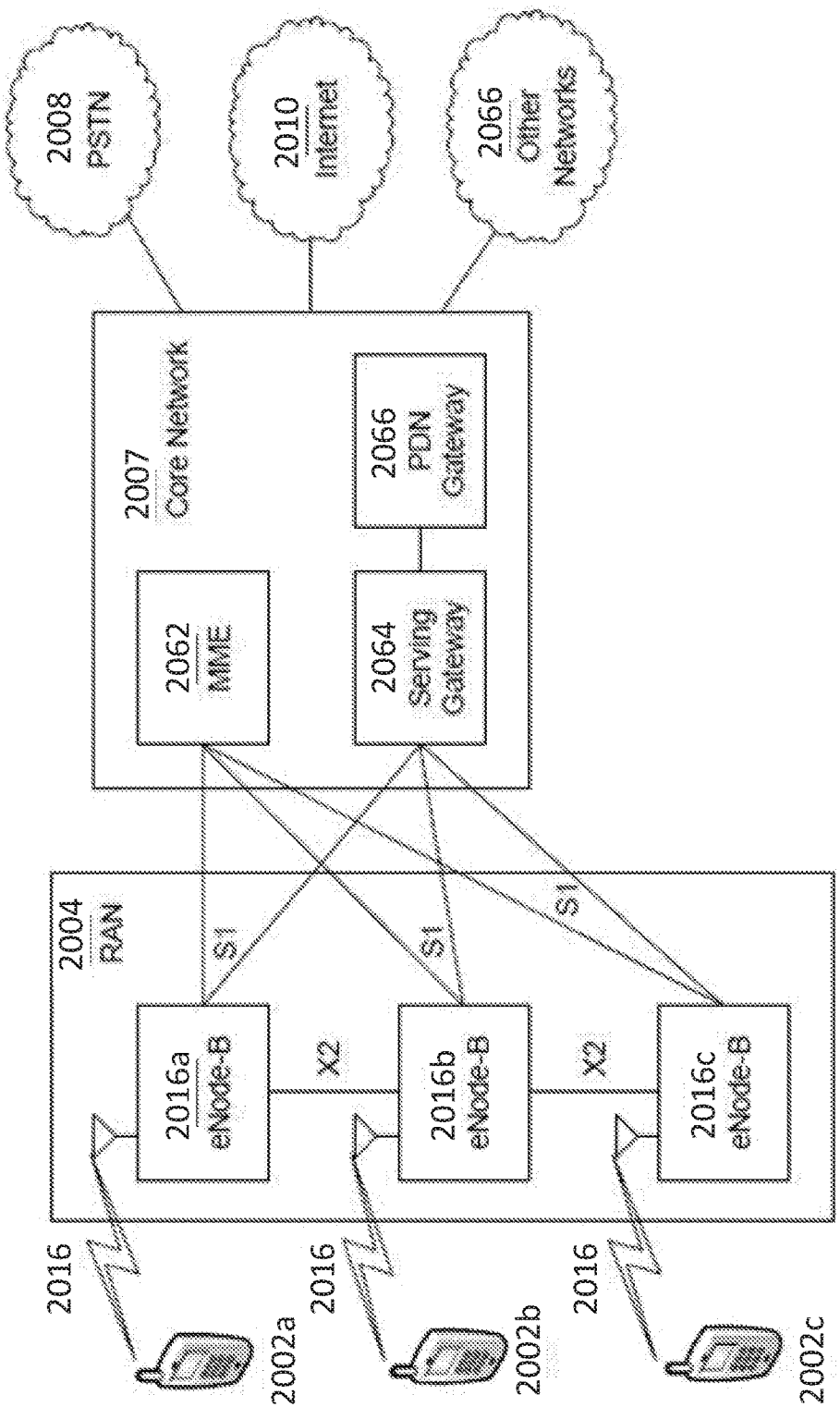
FIG. 20D is a system diagram of another example radio access network and another example core network that may be used within the communications system illustrated in FIG. 20A.

FIG. 20D is a system diagram of the RAN 2004 and the core network 2007. As noted above, the RAN 2004 may employ an E-UTRA radio technology to communicate with the WTRUs 2002a, 2002b, 2002c over the air interface 2016. The RAN 2004 may also be in communication with the core network 2007.

The RAN 2004 may include eNode-Bs 2060a, 2060b, 2060c, though it will be appreciated that the RAN 2004 may include any number of eNode-Bs. The eNode-Bs 2060a. 2060b, 2060c may each include one or more transceivers for communicating with the WTRUs 2002a, 2002b. 2002c over the air interface 2016. The eNode-Bs 2060a, 2060b. 2060c may implement MIMO technology. Thus, the eNode-B 2060a, for example, may use multiple antennas to transmit wireless signals to, and receive wireless signals from, the WTRU 2002a.

Each of the eNode-Bs 2060a, 2060b, 2060c may be associated with a particular cell (not shown) and may be configured to handle radio resource management decisions, handover decisions, scheduling of users in the uplink and/or downlink, and the like. As shown in FIG. 20D, the eNode-Bs 2060a, 2060b, 2060c may communicate with one another over an X2 interface.

The core network 2007 shown in FIG. 20D may include a mobility management gateway (MME) 2062, a serving gateway 2064, and a packet data network (PDN) gateway 2066. While each of the foregoing elements are depicted as part of the core network 2007, it will be appreciated that any one of these elements may be owned and/or operated by an entity other than the core network operator.

The MME 2062 may be connected to each of the eNode-Bs 2060a, 2060b, 2060c in the RAN 2004 via an S1 interface and may serve as a control node. For example, the MME 2062 may be responsible for authenticating users of the WTRUs 2002a, 2002b, 2002c, bearer activation/deactivation, selecting a particular serving gateway during an initial attach of the WTRUs 2002a, 2002b, 2002c, and the like. The MME 2062 may also provide a control plane function for switching between the RAN 2004 and other RANs (not shown) that employ other radio technologies, such as GSM or WCDMA.

The serving gateway 2064 may be connected to each of the eNode-Bs 2060a, 2060b. 2060c in the RAN 2004 via the S1 interface. The serving gateway 2064 may generally route and forward user data packets to/from the WTRUs 2002a, 2002b. 2002c. The serving gateway 2064 may also perform other functions, such as anchoring user planes during inter-eNode B handovers, triggering paging when downlink data is available for the WTRUs 2002a, 2002b, 2002c, managing and storing contexts of the WTRUs 2002a, 2002b, 2002c, and the like.

The serving gateway 2064 may also be connected to the PDN gateway 2066, which may provide the WTRUs 2002a, 2002b, 2002c with access to packet-switched networks, such as the Internet 2010, to facilitate communications between the WTRUs 2002a, 2002b, 2002c and IP-enabled devices.

The core network 2007 may facilitate communications with other networks. For example, the core network 2007 may provide the WTRUs 2002a, 2002b, 2002c with access to circuit-switched networks, such as the PSTN 2008, to facilitate communications between the WTRUs 2002a, 2002b, 2002c and traditional land-line communications devices. For example, the core network 2007 may include, or may communicate with, an IP gateway (e.g., an IP multimedia subsystem (IMS) server) that serves as an interface between the core network 2007 and the PSTN 2008. In addition, the core network 2007 may provide the WTRUs 2002a, 2002b, 2002c with access to the networks 2012, which may include other wired or wireless networks that are owned and/or operated by other service providers.

Figure 20E:
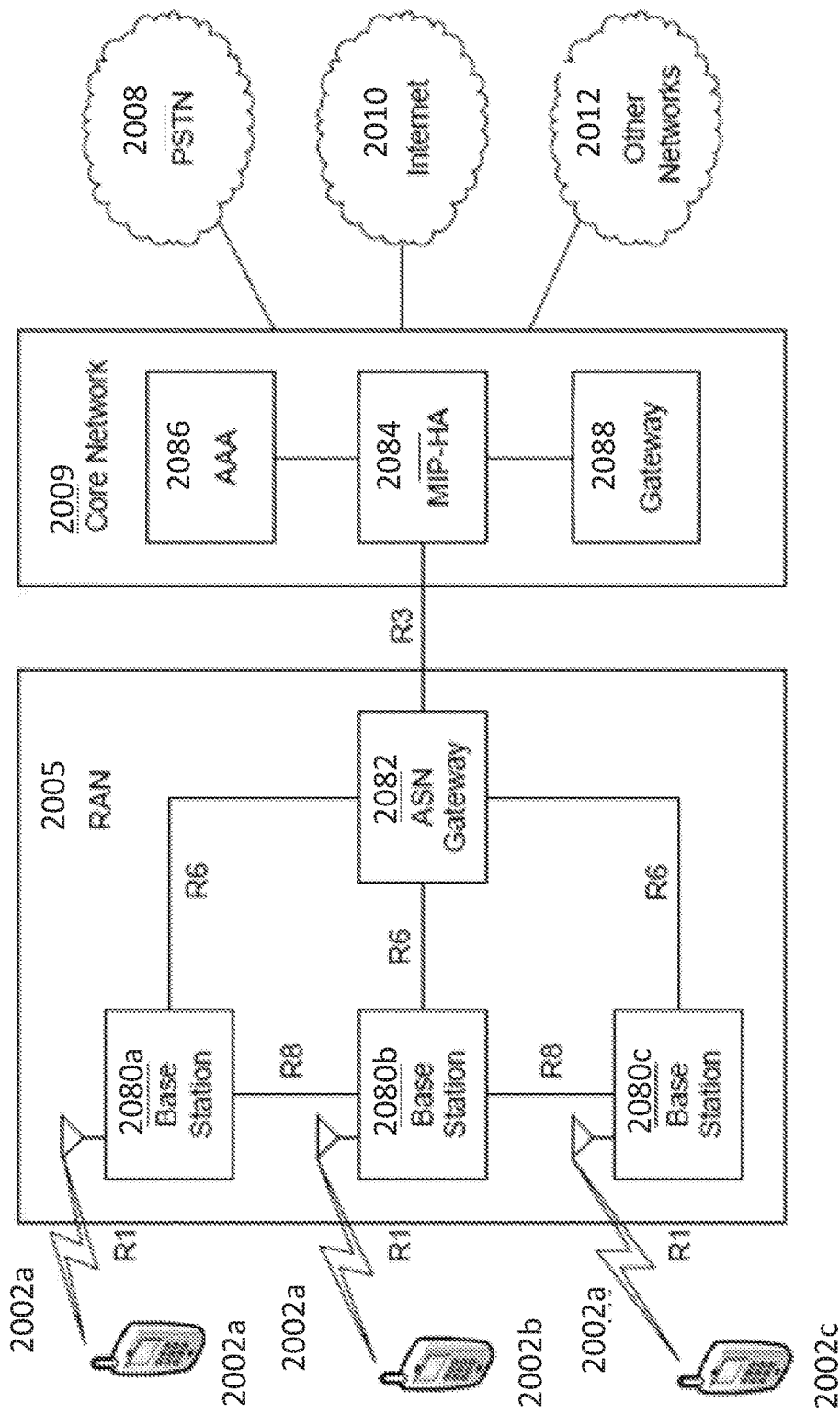
FIG. 20E is a system diagram of another example radio access network and another example core network that may be used within the communications system illustrated in FIG. 20A.

FIG. 20E is a system diagram of the RAN 2005 and the core network 2009. The RAN 2005 may be an access service network (ASN) that employs IEEE 802.16 radio technology to communicate with the WTRUs 2002a, 2002b, 2002c over the air interface 2017. As will be further discussed below, the communication links between the different functional entities of the WTRUs 2002a, 2002b, 2002c, the RAN 2005, and the core network 2009 may be defined as reference points.

As shown in FIG. 20E, the RAN 2005 may include base stations 2080a, 2080b, 2080c, and an ASN gateway 2082, though it will be appreciated that the RAN 2005 may include any number of base stations and ASN gateways. The base stations 2080a. 2080b, 2080c may each be associated with a particular cell (not shown) in the RAN 2005 and may each include one or more transceivers for communicating with the WTRUs 2002a, 2002b, 2002c over the air interface 2017. The base stations 2080a, 2080b, 2080c may implement MIMO technology. Thus, the base station 2080a, for example, may use multiple antennas to transmit wireless signals to, and receive wireless signals from, the WTRU 2002a. The base stations 2080a, 2080b, 2080c may also provide mobility management functions, such as handoff triggering, tunnel establishment, radio resource management, traffic classification, quality of service (QoS) policy enforcement, and the like. The ASN gateway 2082 may serve as a traffic aggregation point and may be responsible for paging, caching of subscriber profiles, routing to the core network 2009, and the like.

The air interface 2017 between the WTRUs 2002a, 2002b, 2002c and the RAN 2005 may be defined as an R1 reference point that implements the IEEE 802.16 specification. In addition, each of the WTRUs 2002a, 2002b, 2002c may establish a logical interface (not shown) with the core network 2009. The logical interface between the WTRUs 2002a, 2002b, 2002c and the core network 2009 may be defined as an R2 reference point, which may be used for authentication, authorization, IP host configuration management, and/or mobility management.

The communication link between each of the base stations 2080a, 2080b, 2080c may be defined as an R8 reference point that includes protocols for facilitating WTRU handovers and the transfer of data between base stations. The communication link between the base stations 2080a, 2080b, 2080c and the ASN gateway 2082 may be defined as an R6 reference point. The R6 reference point may include protocols for facilitating mobility management based on mobility events associated with each of the WTRUs 2002a, 2002b, 2002c.

As shown in FIG. 20E, the RAN 2005 may be connected to the core network 2009. The communication link between the RAN 2005 and the core network 2009 may defined as an R3 reference point that includes protocols for facilitating data transfer and mobility management capabilities, for example. The core network 2009 may include a mobile IP home agent (MIP-HA) 2084, an authentication, authorization, accounting (AAA) server 2086, and a gateway 2088. While each of the foregoing elements are depicted as part of the core network 2009, it will be appreciated that any one of these elements may be owned and/or operated by an entity other than the core network operator.

The MIP-HA may be responsible for IP address management, and may enable the WTRUs 2002a, 2002b, 2002c to roam between different ASNs and/or different core networks. The MIP-HA 2084 may provide the WTRUs 2002a, 2002b, 2002c with access to packet-switched networks, such as the Internet 2010, to facilitate communications between the WTRUs 2002a, 2002b, 2002c and IP-enabled devices. The AAA server 2086 may be responsible for user authentication and for supporting user services. The gateway 2088 may facilitate interworking with other networks. For example, the gateway 2088 may provide the WTRUs 2002a, 2002b, 2002c with access to circuit-switched networks, such as the PSTN 2008, to facilitate communications between the WTRUs 2002a, 2002b, 2002c and traditional land-line communications devices. In addition, the gateway 2088 may provide the WTRUs 2002a, 2002b, 2002c with access to the networks 2012, which may include other wired or wireless networks that are owned and/or operated by other service providers.

Although not shown in FIG. 20E, it will be appreciated that the RAN 2005 may be connected to other ASNs and the core network 2009 may be connected to other core networks. The communication link between the RAN 2005 the other ASNs may be defined as an R4 reference point, which may include protocols for coordinating the mobility of the WTRUs 2002a, 2002b. 2002c between the RAN 2005 and the other ASNs. The communication link between the core network 2009 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for encoding video data, the method comprising:
   identifying a first best mode for encoding a coding unit of the video data;
   identifying a first set of quantized residual values associated with the first best mode;
   determining whether the first set of quantized residual values comprise a nonzero value and whether the first best mode is an intra-block copy (IntraBC) mode or a skip mode;
   based on a determination that the first set of quantized residual values comprise a nonzero value or that the first best mode is neither the IntraBC mode nor the skip mode,
      determining whether a width of the coding unit is less than or equal to a coding width threshold; and
      performing a 2N×2N IntraBC mode check for the coding unit via a first predictor based search on a condition that the width of the coding unit is less than or equal to the coding width threshold; and
   based on a determination that the first set of quantized residual values comprises all zero values and that the first best mode is the IntraBC mode or the skip mode, skipping a predictor based 2N×2N IntraBC mode check for the coding unit.

2. The method of claim 1, further comprising:
   identifying a second best mode for encoding the coding unit;
   identifying a second set of quantized residual values associated with the second best mode;
   determining whether the second set of quantized residual values comprise a nonzero value and whether the second best mode is the IntraBC mode or the skip mode;
   based on a determination that the second set of quantized residual values comprise a nonzero value or that the second best mode is neither the IntraBC mode nor the skip mode:
   performing a N×2N IntraBC mode check for the coding unit via a second predictor based search on a condition that the width of the coding unit is less than or equal to the coding width threshold.

3. The method of claim 2, wherein the second best mode for encoding the coding unit and the second set of quantized residual values are identified upon the first predictor based search.

4. The method of claim 2, further comprising:
identifying a third best mode for encoding the coding unit;
identifying a third set of quantized residual values associated with the third best mode;
determining whether the third set of quantized residual values comprise a nonzero value and whether the third best mode for encoding the coding unit is the IntraBC mode or the skip mode;
based on a determination that the third set of quantized residual values comprise a nonzero value or that the third best mode for encoding the coding unit is neither the IntraBC nor the skip mode, performing a 2N×N IntraBC mode check for the coding unit via a third predictor based search on a condition that the width of the coding unit is less than or equal to the coding width threshold.

5. The method of claim 4, wherein the third best mode for encoding the coding unit and the third set of quantized residual values are identified upon the second predictor based search.

6. The method of claim 4, wherein the 2N×N IntraBC mode check is performed based on an inter-slice coding.

7. The method of claim 4, further comprising:
identifying a fourth best mode for encoding the coding unit;
identifying a fourth set of quantized residual values associated with the fourth best mode;
determining whether the fourth set of quantized residual values comprise a nonzero value and whether the fourth best mode for encoding the coding unit is the IntraBC mode or the skip mode;
determining a rate distortion cost associated with the fourth best mode; and
based on a determination that the fourth set of quantized residual values comprise a nonzero value or that the fourth best mode for encoding the coding unit is neither the IntraBC mode nor the skip mode, performing a 2N×2N IntraBC mode check for the coding unit with at least one of a spatial search or a hash search on a condition that the width of the coding unit is less than the coding width threshold, and the rate distortion cost is greater than a cost threshold.

8. The method of claim 7, wherein the fourth best mode for encoding the coding unit and the fourth set of quantized residual values are identified upon at least one of the second predictor based search or the third predictor based search.

9. The method of claim 1, wherein the coding width threshold is 32.

10. A video coding device for encoding video data, the device comprising:
a processor configured to:
identify a first best mode for encoding a coding unit of the video data;
identify a first set of quantized residual values associated with the first best mode;
determine whether the first set of quantized residual values comprise a nonzero value and whether the first best mode is an intra-block copy (IntraBC) mode or a skip mode;
based on a determination that the first set of quantized residual values comprises a nonzero value or that the first best mode is neither the IntraBC mode nor the skip mode,
determine whether a width of the coding unit is less than or equal to a coding width threshold; and
perform a 2N×2N IntraBC mode check for the coding unit via a first predictor based search on a condition that the width of the coding unit is less than or equal to the coding width threshold; and
based on a determination that the first set of quantized residual values comprises all zero values and that the first best mode is the IntraBC mode or the skip mode, skip a predictor based 2N×2N IntraBC mode check for the coding unit.

11. The video coding device of claim 10, wherein the processor is configured to:
identify a second best mode for encoding the coding unit;
identify a second set of quantized residual values associated with the second best mode;
determine whether the second set of quantized residual values comprise a nonzero value and whether the second best mode is the IntraBC mode or the skip mode;
based on a determination that the second set of quantized residual values comprise a nonzero value or that the second best mode is neither the IntraBC mode nor the skip mode, perform a N×2N IntraBC mode check for the coding unit via a second predictor based search on a condition that the width of the coding unit is less than or equal to the coding width threshold.

12. The video coding device of claim 11, wherein the second best mode for encoding the coding unit and the second set of quantized residual values are identified upon the first predictor based search.

13. The video coding device of claim 11, wherein the processor is configured to:
identify a third best mode for encoding the coding unit;
identify a third set of quantized residual values associated with the third best mode;
determine whether the third set of quantized residual values comprise a nonzero value and whether the third best mode for encoding the coding unit is the IntraBC mode or the skip mode;
based on a determination that the third set of quantized residual values comprise a nonzero value or that the third best mode for encoding the coding unit is neither the IntraBC nor the skip mode, perform a 2N×N IntraBC mode check for the coding unit via a third predictor based search on a condition that the width of the coding unit is less than or equal to the coding width threshold.

14. The video coding device of claim 13, wherein the third best mode for encoding the coding unit and the third set of quantized residual values are identified upon the second predictor based search.

15. The video coding device of claim 13, wherein the 2N×N IntraBC mode check is performed based on an inter-slice coding.

16. The video coding device of claim 13, wherein the processor is configured to:
identify a fourth best mode for encoding the coding unit;
identify a fourth set of quantized residual values associated with the fourth best mode;
determine whether the fourth set of quantized residual values comprise a nonzero value and whether the fourth best mode for encoding the coding unit is the IntraBC mode or the skip mode;
determine a rate distortion cost associated with the fourth best mode;
based on a determination that the fourth set of quantized residual values comprise a nonzero value or that the fourth best mode for encoding the coding unit is neither the IntraBC mode nor the skip mode, perform a 2N×2N IntraBC mode check for the coding unit with at least one of a spatial search or a hash search on a condition that the width of the coding unit is less than the coding width threshold, and the rate distortion cost is greater than a cost threshold.

17. The video coding device of claim 16, wherein the fourth best mode for encoding the coding unit and the fourth set of quantized residual values are identified upon at least one of the second predictor based search or the third predictor based search.

18. The video coding device of claim 10, wherein the coding width threshold is 32.

19. A video coding device for encoding video data, the device comprising:
a processor configured to:
identify a first best mode for encoding a coding unit of the video data;
identify a first set of quantized residual values associated with the first best mode;
determine whether the first set of quantized residual values comprise a nonzero value and whether the first best mode is an intra-block copy (IntraBC) mode or a skip mode; and
based on a determination that the first set of quantized residual values comprises a nonzero value or that the first best mode is neither the IntraBC mode nor the skip mode:
determine whether a width of the coding unit is less than or equal to a coding width threshold;
on a condition that the width of the coding unit is less than or equal to the coding width threshold:
perform a 2N×2N IntraBC mode check for the coding unit via a first predictor based search;
identify a second best mode for encoding the coding unit;
identify a second set of quantized residual values associated with the second best mode;
determine whether the second set of quantized residual values comprise a nonzero value and whether the second best mode is the IntraBC mode or the skip mode;
based on a determination that the second set of quantized residual values comprise a nonzero value or that the second best mode is neither the IntraBC mode nor the skip mode:
perform a N×2N IntraBC mode check for the coding unit via a second predictor based search;
identify a third best mode for encoding the coding unit;
identify a third set of quantized residual values associated with the third best mode;
determine whether the third set of quantized residual values comprise a nonzero value and whether the third best mode for encoding the coding unit is the IntraBC mode or the skip mode; and
based on a determination that the third set of quantized residual values comprise a nonzero value or that the third best mode for encoding the coding unit is neither the IntraBC nor the skip mode:
perform a 2N×N IntraBC mode check for the coding unit via a third predictor based search.

* * * * *